United States Patent
Kalman

[11] Patent Number: 6,164,683
[45] Date of Patent: Dec. 26, 2000

[54] LOAD TRANSPORTING TRAILER

[76] Inventor: Frank Kalman, 4203 Poinsettia Ave., San Luis Obispo, Calif. 93401

[21] Appl. No.: 09/004,599

[22] Filed: Jan. 8, 1998

Related U.S. Application Data

[63] Continuation-in-part of application No. 08/685,164, Jul. 23, 1996.

[51] Int. Cl.$^7$ ............................................ B62B 1/04
[52] U.S. Cl. .......................... 280/656; 211/17; 224/537; 224/924; 280/39; 280/40; 280/47.19; 280/124.162; 280/652; 296/182
[58] Field of Search ............................... 296/182; 211/17, 211/20; 224/924, 537; 280/656, 38, 39, 40, 652, 47.131, 47.19, 63, 65, 769, 47.26, 47.24, 124.162

[56] References Cited

U.S. PATENT DOCUMENTS

| | | | |
|---|---|---|---|
| 2,468,914 | 5/1949 | Banaszak et al. | 280/40 |
| 2,469,506 | 5/1949 | Kerr et al. | 280/33.4 |
| 2,879,072 | 3/1959 | Rear et al. | 280/40 |
| 3,025,985 | 3/1962 | Crawford | 214/505 |
| 3,031,180 | 4/1962 | Sergay . | |
| 3,367,675 | 2/1968 | Gearin | 280/34 |
| 3,451,690 | 6/1969 | Cravens | 280/40 |
| 3,781,030 | 12/1973 | Ekedal | 280/36 |
| 3,941,406 | 3/1976 | Eggleston | 280/400 |
| 4,230,340 | 10/1980 | Wasservogel | 280/656 |
| 4,239,258 | 12/1980 | Burris | 280/639 |
| 4,442,961 | 4/1984 | Bott . | |
| 4,453,735 | 6/1984 | Penverne et al. | 280/47.18 |
| 5,397,148 | 3/1995 | Nelson | 280/416.1 |

Primary Examiner—Eric Culbreth
Attorney, Agent, or Firm—Leo F. Costello

[57] ABSTRACT

A trailer is provided that is especially suited for transporting bicycles and has load supporting, suspension, storage, parking, and rolling functions. The trailer has a main frame providing a trailer bed, adapted to support a plurality of bicycles, and a high performance suspension system. The suspension system includes a pair of independent suspension units including trailer wheels mounted by suspension arms on opposite sides of the main frame for elevational movement in earth traversing positions and for pivoting movement between the earth traversing positions disposed outwardly of the sides of the main frame and stowing positions folded under the main frame. The suspension units include heavy duty shock absorbers that cushion the bicycle or other load, maintain the bicycles in level upright positions during earth traversal, and maximize traction of the wheels. The frame and suspension units are movable between a traveling mode wherein the trailer bed of the frame is generally horizontal and the wheels are in their ground-engaging positions and a collapsed, stowing mode wherein the frame and suspension units are upright in a generally A-shaped relation and the wheels are in their stowing positions. A tow bar is interchangeably connected to the main frame in a towing position or in a stowing position. The trailer is also tiltable with a load of bicycles into a parking position, can be rolled sideways on its wheels when collapsed, and is made of parts that can be dissembled for convenient UPS shipping and then subsequently re-assembled for use.

18 Claims, 13 Drawing Sheets

LOAD TRANSPORTING TRAILER

RELATED APPLICATION

This application is a continuation-in-part of my prior copending application filed Jul. 23, 1996, and bearing application Ser. No. 08/685,164.

FIELD OF THE INVENTION

The present invention pertains to a load transporting trailer and more particularly to a trailer which has load supporting, suspension, storage, parking, and rolling functions and which is especially suited for transporting bicycles.

BACKGROUND

Bicycles are commonly transported on the back, top or front of a motor vehicle, motor home, house trailer, or the like. They are normally carried in an upright position on a bracket attached to the front or back of the vehicle or on rails attached to the top of the vehicle. Various types of clamps, straps or cords are used to secure the bike to the bracket or rail. These transporting methods have been used for many years and do an effective job in transporting bicycles, but they do have their limitations.

One of the problems of transporting bicycles on an automobile is the possibility of damaging the vehicle or the bicycles if the bicycles are dropped, fall over, or otherwise strike the body of the vehicle, causing dents or scratches. Another problem is the very fact that the bicycles are directly attached to the vehicle. It may be desirable to separate the bicycles from the vehicle in order to use the vehicle without the bicycles attached, while at the same time maintaining the bicycles in a secured position for storage purposes. Also, many people are uncomfortable driving an automobile with bicycles on the roof or hanging from the front or rear of the vehicle. Still further, these conventional transporting methods are limited in the number of bicycles that can be transported at one time. In addition, lifting bicycles onto an automobile, especially onto the roof, is difficult and awkward.

Insofar as is known, trailers especially adapted for transporting bicycles have not been developed. Bicycles may of course be carried lying down on many types of trailers, but such a method is of little practical use because of the obvious damage to the bicycle or bicycles. Also, trailers are known for carrying motorcycles, such as disclosed in U.S. Pat. No. 3,781,030, but transporting a bicycle involves problems different from those encountered in transporting a motorcycle, particularly regarding the relative weight and fragility of a bicycle compared to a motorcycle.

SUMMARY

A trailer is provided which is especially suited for transporting bicycles and has load supporting, suspension, storage, parking, and rolling functions. The trailer has a main frame providing a trailer bed, on which a plurality of bicycles can be attached and a high performance suspension system for supporting the frame. The suspension system includes a pair of independent suspension units including trailer wheels mounted by suspension arms on opposite sides of the main frame for elevational movement in earth traversing positions and for pivoting movement between the earth traversing positions disposed outwardly of the sides of the main frame and stowing positions folded under the main frame. The suspension units include heavy duty shock absorbers that cushion the bicycles or other load, maintain the bicycles in level upright positions during earth traversal, and maximize traction of the wheels. The frame and suspension units are movable between a traveling mode wherein the trailer bed of the frame is generally horizontal and the wheels are in their ground-engaging positions and a collapsed, stowing mode wherein the frame and suspension units are upright in a generally A-shaped relation and the wheels are in their stowing positions. A towbar is interchangeably connected to the main frame in a towing position or in a stowing position. The trailer is also tiltable with a load of bicycles into a parking position, can be rolled sideways on its wheels when collapsed, and is made of parts that can be dissembled for convenient UPS shipping and then subsequently re-assembled for use.

An object of the present invention is to provide a trailer that has load supporting, suspension, storage, parking, and rolling functions.

Another object is transport one or more bicycles in a secure and dependable manner.

A further object is to obviate the need for transporting bicycles on the body of a motor vehicle, motor home, or house trailer.

Yet another object is to enable bicycles to be transported with the use of a motor vehicle but without being directly attached to the body of the vehicle so that the bicycles can be separated from the vehicle while still held in secure positions for storage purposes.

Another object is to provide a trailer which has the capability of dependably transporting a plurality, at least five or more but fewer if desired, bicycles in spaced, upstanding positions at highway speeds and around comers while still maintaining their upright positions and without imposing undesired reactive forces on the drawing vehicle.

An important object is to provide a trailer with a high performance suspension system that dampens bouncing and cushions and isolates the load, for example bicycles, from bumps at high as well as all other speeds.

Another object is to provide a trailer with an independent suspension system that maintains traction of the wheels with the supporting surface, even over rough terrain.

An additional object is to provide a trailer that tracks well behind a pulling vehicle.

A further object is to provide a high performance independent suspension system for a trailer while enabling the wheels to be pivoted between earth traversing and stowing positions.

Another object is to fit a shock absorber with a coaxial cylinder, piston and spring between the frame and wheels of a trailer while keeping the trailer bed at a low level and allowing pivoting of the wheels between earth traversing and stowing positions.

A still further object is to provide a trailer that can be manually maneuvered into various positions or modes, including an earth traversing mode, a parking mode, and a storage mode, and a rolling mode in which it can be manually rolled sideways by one person.

Still another object is to enable a trailer capable of hauling loads, such as bicycles, behind a vehicle to be collapsed into a rolling mode wherein it can be manually rolled sideways by a single person through a relatively narrow passageway, such as a standard doorway, even though the weight of the trailer and its size when expanded would otherwise make it extremely difficult or impossible to achieve such handling.

Another object is to provide a trailer that has a low profile to facilitate its loading and unloading especially with a plurality of bicycles.

A further object is to provide a suspension system for a trailer for carrying bicycles which enables damage-free transport of the bicycles at highway speeds under various weather conditions, which maintains the bicycles in balanced upright positions, and which has sufficient road traction to avoid flipping over.

Yet an additional object is to enable more bicycles to be transported at one time than can typically be transported on presently available bicycle transporting equipment.

Another object is to provide a trailer that can be manufactured and sold in kit form.

An additional object is to provide a trailer that can be disassembled into parts having dimensions acceptable for shipping by the United Parcel Service and can be subsequently easily assembled.

A further object is to provide a trailer that is collapsible and can be stood on end for storage purposes.

Still another object is to provide a trailer that can be dependably and compactly stored in a standing position against a garage wall.

A feature of this invention is that the trailer tongue or drawbar serves for drawing the trailer and for supporting the trailer in its stowed position.

Another object is to provide a trailer which is durable notwithstanding assembly from a kit.

These and other objects, features and advantages of the present invention will become apparent upon reference to the following description, accompanying drawings, and appended claims.

DESCRIPTION OF THE DRAWINGS

FIG. 13a is an enlarged longitudinal vertical section taken on line 13a—13a in FIG. 13.

DETAILED DESCRIPTION—FIRST EMBODIMENT

With reference to FIGS. 1 through 4, a first embodiment of a trailer constructed in accordance with the principles of the present invention is identified by the numeral 20. Although subsequently described in greater detail, it is useful at this point to note that the first embodiment of the trailer is operable in several different modes or conditions, namely, an earth-traversing mode (FIGS. 1 through 4, 8), a stowing mode (FIG. 5), and a parking mode (FIG. 9). For the most part, however, the attitudinal references used to describe the trailer assume the earth-traversing mode since this is its principle mode of use.

Figure 2:
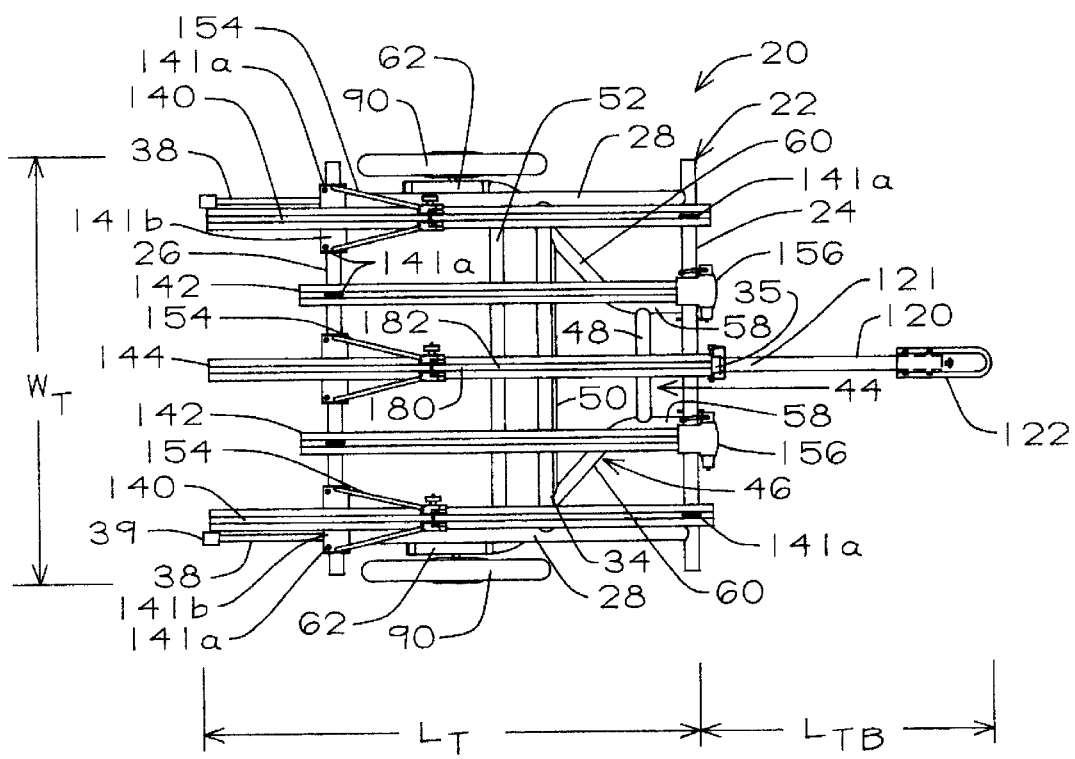
FIG. 2 is a top-plan view of the trailer shown in FIG. 1.
Figure 3:
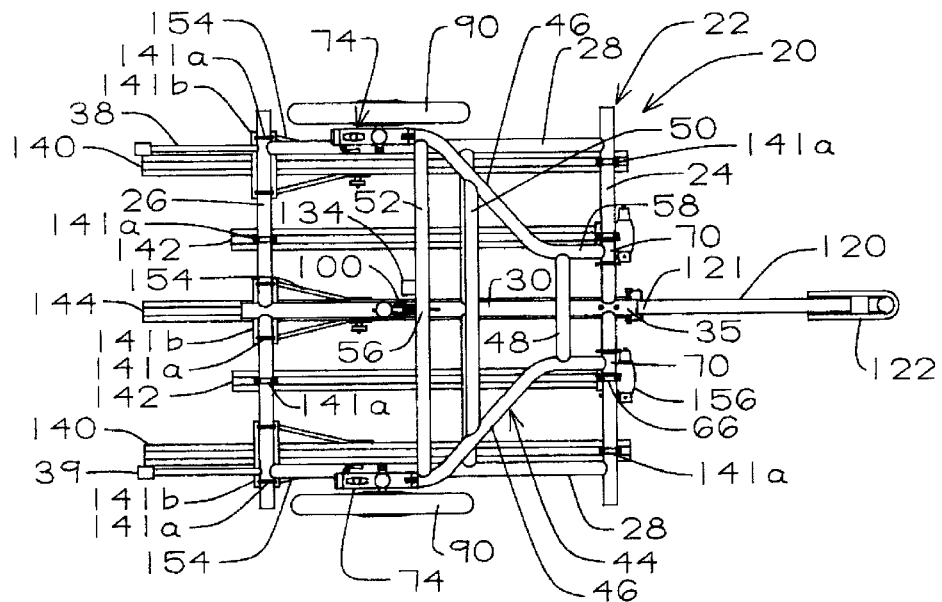
FIG. 3 is a bottom-plan view of the trailer of FIGS. 1 and 2.

Thus, the trailer 20 (FIGS. 1 and 4) includes an upper load supporting or main frame 22 preferably of steel tubing welded together in the construction described, it being understood that aluminum or other suitable materials could be used. The load supporting frame is composed of straight, coplanar, front, rear, and side tubes 24, 26, and 28 connected in a generally square shape in plan view, as best seen in FIGS. 2 and 3. The load-supporting frame also includes a longitudinal central tube 30 interconnecting the front and rear tubes and a transverse tube 34 interconnecting the side tubes and the central tube. The tubes thus define a trailer bed of the trailer.

Figure 4:
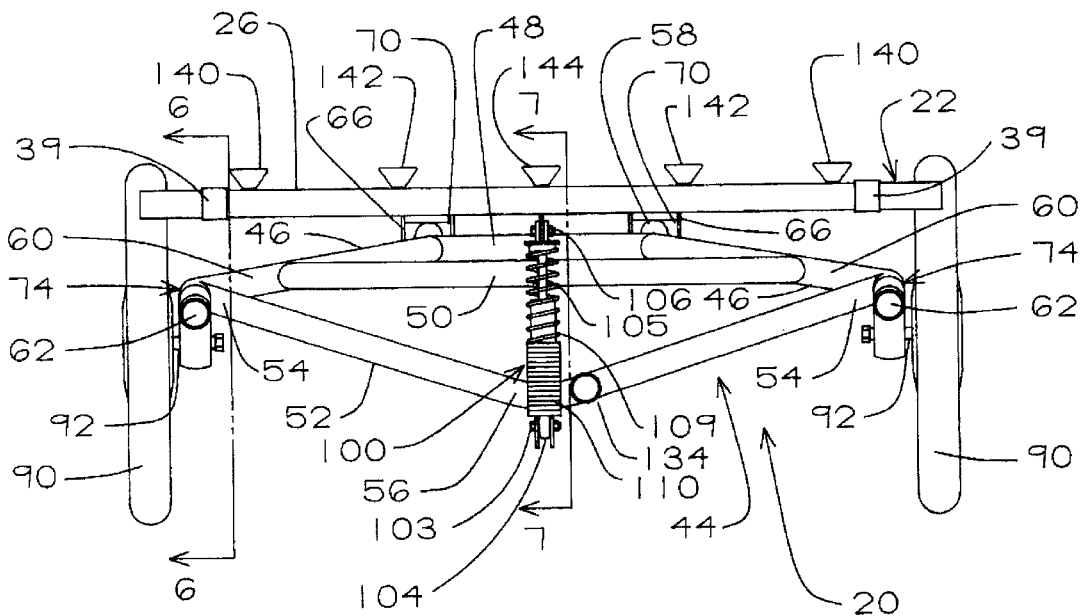
FIG. 4 is an enlarged rear elevation of the trailer shown in FIGS. 1 through 3.

The central tube 30 (FIGS. 2 and 3) defines a longitudinal axis which is an axis of symmetry for the load supporting frame 22 as well as the trailer 20 as a whole and terminates in a front towing socket or coupling 35. The transverse tube 34 is closer to the front tube 24 than to the rear tube 26 and is thus spaced forwardly of the transverse central axis of the load-supporting frame. The front and rear tubes have opposite ends which extend laterally outwardly of the side tubes 28, as best seen in FIGS. 2 through 4. Main stowing legs 38 fitted with rubber feet 39 are respectively secured to the opposite ends of the rear tube 26 and project rearwardly therefrom in generally the same plane as the load-supporting frame 22 and in alignment with the side tubes 28.

The trailer 20 also includes a lower suspension or auxiliary frame 44 which is likewise preferably of steel tubing and welded construction but may be of aluminum as with the main frame 22. The suspension frame has a generally wish-bone shape in plan view, as best seen in FIGS. 2 and 3, and includes a pair of transversely spaced dogleg-shaped side tubes or arms 46 interconnected by front, intermediate, and rear transverse tubes 48, 50, and 52, it being noted that the intermediate tube may optionally be removed to reduce weight. The front and intermediate tubes of the suspension frame are straight and coplanar with the side tubes or arms of the suspension frame, but the rear transverse tube 52 is V-shaped in rear elevation (FIG. 4) with opposite-end portions 54 converging downwardly to a central apex 56. This central apex lies in a longitudinal vertical plane about which the suspension frame is symmetrical.

The side tubes or arms 46 (FIGS. 2 through 4) of the suspension frame 44 include longitudinally extending, transversely spaced, parallel front portions 58 interconnected by the front tube 48. The arms 46 also include intermediate portions 60 rearwardly diverging from the front portions and interconnected by the intermediate tube 50. In addition, longitudinally extending rear portions 62 of the arms 46 project rearwardly from the intermediate portions in spaced parallel relation to each other and in parallel relation to the front portions. The spacing of the front portions 58 defines the minimum width of the suspension frame, and the spacing of the rear portions defines the maximum width of the suspension frame.

A pair of pivot brackets 66 (FIGS. 1, 3, 4) is releasably attached to the front tube 24 of the load-supporting frame 22 equidistantly on opposite sides of the central tube 30. These brackets support coaxial, horizontal pivot pins 68 in spaced parallel relation to and below the front tube, and bushings 70 are rotatably mounted on the pins. The front portions 58 of the suspension frame are secured to the bushings, thereby pivotally mounting the suspension frame 44 on and underneath the load-supporting frame 22. Thus, the two frames are movable upwardly and downwardly relative to each other.

Having described the pivotal mounting of the suspension frame 44 on the load-supporting frame 22, it is useful to describe certain additional relationships between the two frames (FIGS. 2 and 3) in this first embodiment. The length of the suspension frame is approximately three-fourths of the length of the load-supporting frame, as measured by the spacing of the front and rear tubes 24 and 26, and its maximum width is slightly greater than the width of the load-supporting frame. Thus, with the suspension frame pivotally attached to and underneath the load-supporting frame as described, the rear portions 62 of the suspension frame are disposed between and below the outer ends of the front and rear tubes 24 and 26 just outwardly of the side tubes 28 (FIGS. 2 and 4). Furthermore, the apex 56 of the rear transverse tube 52 of the suspension frame is in the same longitudinal vertical plane as the central tube 30 of the load-supporting frame (FIGS. 3 and 4) and is rearwardly adjacent to an imaginary vertical line which passes through the center of the load-supporting frame. As such, the rear transverse tube 52 of the suspension frame is located just rearwardly of said imaginary vertical line.

Figure 6:
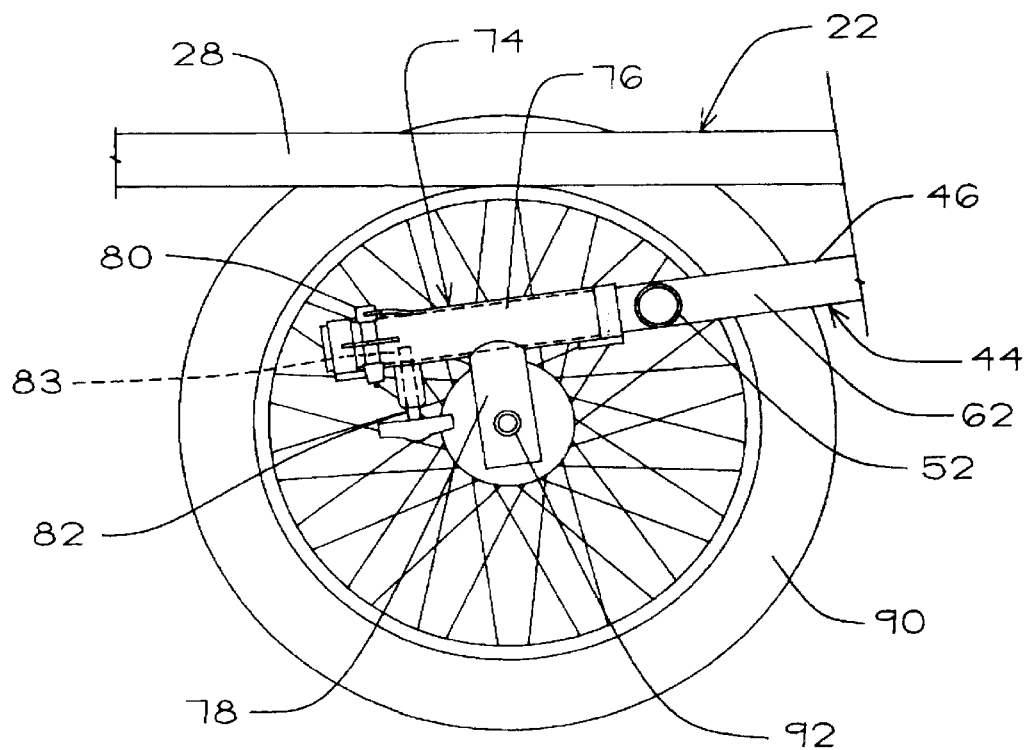
FIG. 6 is an enlarged, longitudinal, fragmentary section taken on Line 6—6 in FIG. 4.

With reference to FIGS. 3, 4, and 6, in particular, wheel mounts 74 are releasably connected to the rear portions 62 of the side arms 46 of the suspension frame 44. Each mount includes a sleeve 76 (FIG. 6) rotatably received on its respective rear portion 62, a tubular arm 78 perpendicularly extending from the sleeve, a quick-release clamp 80, and a retaining pin 82. The clamp is a well-known over-center device connected to the sleeve and movable between a clamping position frictionally resisting rotation of the sleeve on the rear portion 62 and a releasing position permitting such rotation. The retaining pin is also connected to the sleeve and is radially movable between a locked position extending through the sleeve into an aligned hole 83 in the rear portion 62 to preclude rotation of the sleeve on the rear portion and an unlocked position which permits such rotation.

Figure 5:
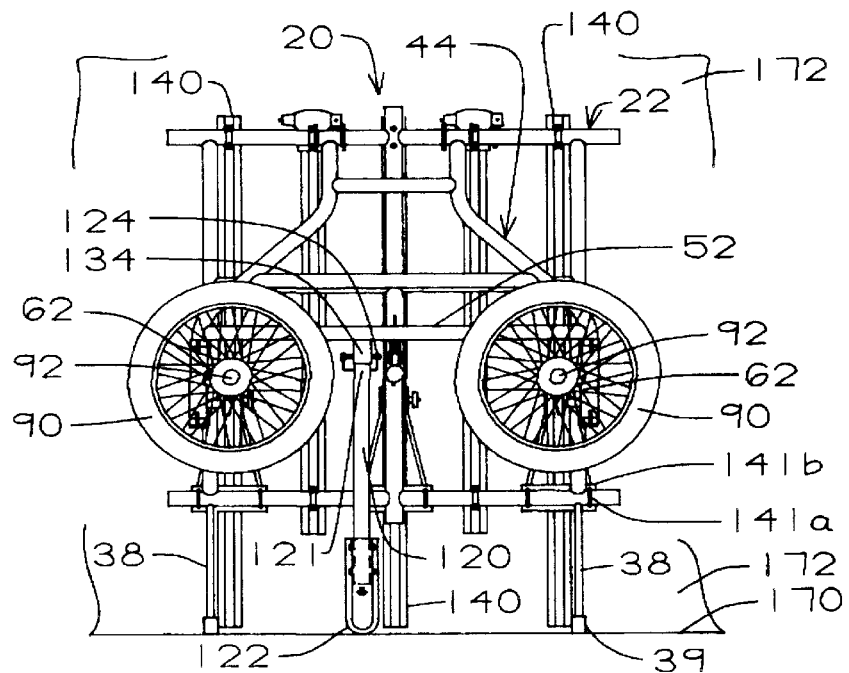
FIG. 5 is an elevational view of the trailer of FIGS. 1 through 4 in its stowed mode and as viewed from the bottom of the trailer.

Trailer wheels 90 having axles 92 are individually releasably rotatably mounted on the arms 78 of the wheel mounts 74 with the axes of the wheels perpendicular to the rear portions 62 of the side arms 46 of the suspension frame 44. In addition, the wheels are pivotally or rotationally movable on their mounts 74 from vertical earth-traversing positions disposed outwardly of the rear portions 62, as shown in FIGS. 1 through 4 and 6, into stowing positions generally parallel to the trailer bed of the main frame, as shown in FIG. 5. More specifically, with the quick-release clamps 80 in their releasing positions and with the retaining pins 82 in their unlocked positions, the wheels can be pivoted on the rear portions 62 between their earth-traversing and stowing positions. In the earth-traversing positions, the wheels are parallel to each other, and in the stowing positions, the wheels are in an obtuse angular relation to each other. In the earth-traversing position, the quick-release clamps are moved into their clamping positions, and the retaining pins are moved into their locking positions, so as to hold the wheels in such position. Such clamping and pinning are unnecessary in the stowing position since the weight of the wheels holds them against the suspension frame 44.

The trailer 20 also includes a suspension system comprising single shock absorber 100 (FIGS. 3, 4, and 6) preferably of the type commonly used in motorcycles. Although the invention is not limited to any particular brand of shock absorber, it is preferred to use a Koni shock absorber EC-315 or Yamaha 401-22210-74-00, either of which is available at motorcycle stores. Thus, the shock absorber includes an hydraulic cylinder 102 releasably pivotally attached by pin 103 to a lower suspension bracket 104 projecting from the apex 56 of the rear tube 52 of the suspension frame 44. The shock absorber also includes a piston rod 105 having an upper end releasably and adjustably connected by a pin 106 through one of several longitudinally spaced holes 107 to an upper suspension bracket 108 attached to the central tube 30 of the load-supporting frame 22 at about the center thereof. The shock absorber also includes a coil spring 109 around the cylinder and piston rod and having opposite ends bearing against upper and lower stops 111 and 112. The shock absorber also includes an oil reservoir 110 mounted adjacent to the cylinder. With particular reference to FIGS. 3 and 4, it is noted that the shock absorber is located at approximately the intersection of the central longitudinal and transverse vertical planes of the trailer 20. The shock absorber is thus interposed the load-supporting and suspension frames 22 and 44 and resiliently resists and cushions movement of the frames toward and away from each other.

Figure 1:
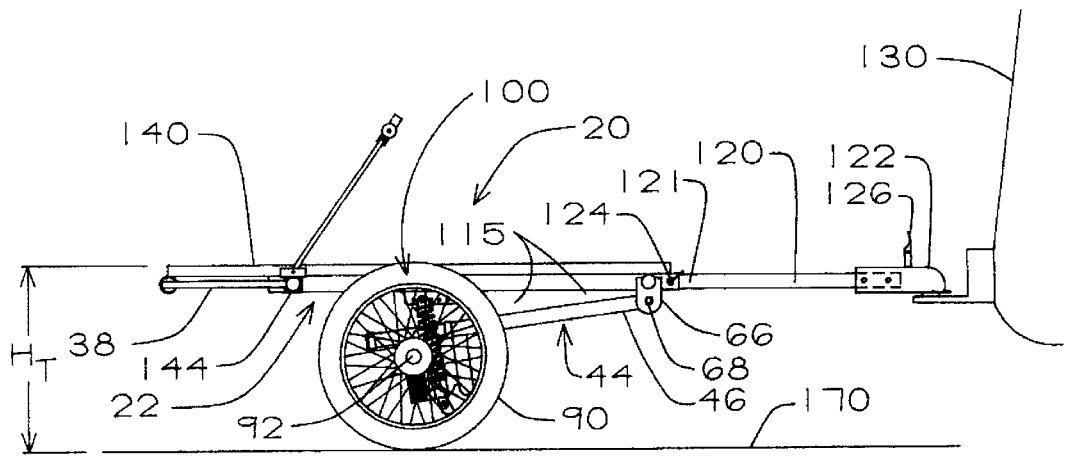
FIG. 1 is a side elevation of a first embodiment of the subject trailer in its earth-traversing mode and connected to a vehicle which is partially shown in side elevation.
Figure 7:
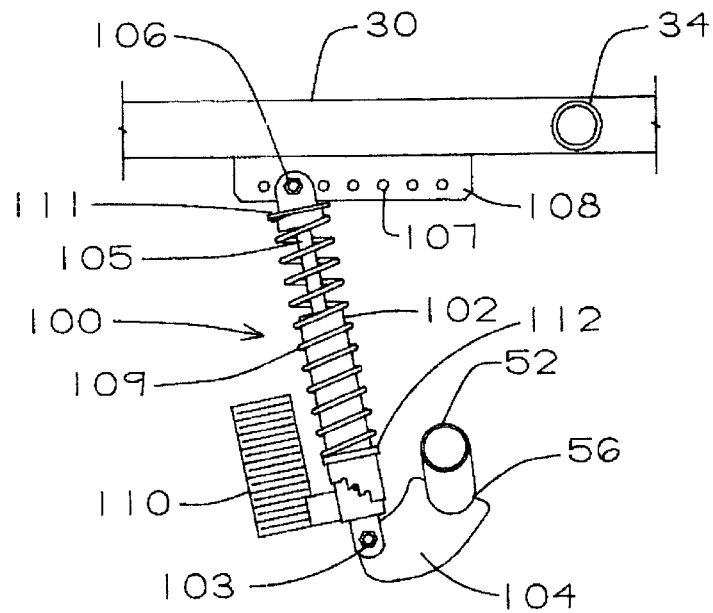
FIG. 7 is an enlarged, longitudinal fragmentary vertical section taken on Line 7—7 in FIG. 4.

Another significant structural relationship about the shock absorber 100 can be observed in FIGS. 1, 4, and 7, in particular. There it is seen that the lower end of the shock absorber 100 at the suspension bracket 104 is connected by the pin 103 to the suspension frame 44, and thus to the trailer wheels 90, below the rotational axes 92 of the wheels. This is noteworthy because a high performance suspension system is essential to the practicability of a trailer for transporting loads such as bicycles. High performance requires motion damping and thus requires more than merely springs, either coil or leaf springs. A shock absorber using a hydraulic cylinder, piston, and spring combination of the type described above and illustrated in FIGS. 1, 4, and 7 is ideal for this application; such shock absorbers are too long (typically about thirteen inches) to fit directly between the bottom of the main frame 22 and the top of the suspension arms 46. FIG. 1 shows the narrow space available at 115. If inserted in this space, the trailer bed would be raised too high so that at best the advantages of a low profile would be lost or at worst the trailer bed would be at an inoperative angle. Accordingly, the point of attachment of the shock absorber to the suspension frame is kept low, below the arms, and below the wheel axes. A towbar 120 (FIGS. 1 through 3) has a rear end 121 releasably insertable into and connectable to the front towing socket or coupling 35 and a front end 122. A link pin 124 releasably secures the rear end of the towbar to the socket 35, and a latch 126 releasably connects the front end to the hitch of a vehicle 130 as partially shown in FIG. 1, in the earth-traversing mode of the trailer 20. A stowing socket or coupling 134 (FIGS. 3 through 5) is affixed to the rear tube 52 of the suspension frame 44 and extends rearwardly therefrom generally parallel to the rear portions 62. The rear end of the towbar is also releasably insertable into and connectable to the stowing socket by the link pin 124 (FIG. 5) for stowing the trailer in a manner to be more specifically described hereinafter.

With reference to FIGS. 1, 2, 4, 8 and 9, outside upwardly opening bicycle channels or rails 140 extend lengthwise or fore and aft of the trailer 20 and are releasably secured by U-shaped fasteners 141*a* and cross plates 141*b*, or by the U-shaped fasteners alone, to the front and rear tubes 24 and 26 of the load-supporting frame 22. Intermediate bicycle channels 142 and a central bicycle channel 144 are similarly disposed and releasably secured to the front and rear tubes. The cross plates extend transversely of the channels and are fastened thereto by screws or bolts. The U-fasteners extend around the tubes and have threaded legs projecting through the plates with nuts threaded down on legs against the plates. At the end of the channels where the U-shaped fasteners are used alone, the fasteners extend around the tubes, the legs extend through the channels, and nuts are threaded down on the legs against the channels. The outside and central channels are relatively long to accommodate longer bicycles, as 150, whereas the intermediate channels are shorter for shorter bicycles, but such lengths may be varied as desired. Typically, the long channels 140 are about fifty-two inches long, whereas the shorter channels 142 are about forty-six inches in length. Even shorter channels of about eight inches may be used as the channels 142 to receive the rear bicycle wheel 148 where a fork clamp 156 is employed.

Furthermore, the channels 140, 142, 144 (FIGS. 1, 2, and 4) are preferably substantially uniformly transversely spaced on the load-supporting frame 22. The outside channels are disposed just inwardly or on top of the side tubes 28 in order to facilitate attachment of these channels to the front and rear tubes by the U-fasteners 141*a*. The channels are releasably secured to the main frame 22 by the fasteners 141*a* and 141*b* since one of the objectives of the invention is to enable assembly of the subject trailer 20 from a kit. Also, another reason is so that the channels can be interchangeable or to allow channels with different lengths to be used, or to replace the channels if damaged.

Each of the channels 140, 142, and 144 (FIGS. 1, 2, 4, and 8) is of a width just sufficient to receive the tire or wheel, as 148, of a bicycle as 150 so that the wheels are restrained against lateral movement. In order to secure the bicycles to the trailer 20, bicycle frame clamps 154 and bicycle fork clamps 156 are mounted for use in association with the various channels. These clamps, per se, are well-known and are thus not shown nor described in detail. Basically, however, and as shown in the preferred embodiment, three frame clamps 154 are pivotally mounted on the fasteners 141*b* in alignment with the outside and central channels for attachment to the frames 160 of bicycles in the outside and central channels. Also, in this first embodiment, two fork clamps 156 are mounted on the front tube 24 in alignment with the intermediate channels for attachment to the forks 162 of bicycles in the intermediate channels. Optionally, one or all of the frame clamps may be mounted on or at the front tube, and one or both the fork clamps may be mounted on or at the rear tube; also, all frame clamps or all fork clamps may be used.

Bicycles 150 (FIGS. 8 and 9) can thus be mounted on the load-supporting main frame 22 with the two wheels 148 of each bicycle positioned in one of the channels 140, 142, or 144. In the outside and central channels, the frame clamp 154 is attached to the front (down tube) of the frame 160 of the bicycle, and an auxiliary clamp or strap 166 fastens the rear wheel to the channel. To use a fork clamp 156, the front wheel of the bicycle 150 is removed, and the rear wheel is positioned in one of the intermediate channels 142. The front fork 162 of such bicycle is positioned in and secured to the fork clamp 156 which is aligned with the selected channel. Here again, an auxiliary clamp or strap secures the rear wheel to its respective channel. In this manner, a plurality (five in the disclosed embodiment) of bicycles can be mounted and secured in upstanding side-by-side positions on the trailer 20.

Although the subject invention is not limited to any particular dimensions, the specific dimensions of the first embodiment of the trailer 20 are now set forth by way of example. Thus, the length (FIG. 2) of the trailer $L_T$ is seven and a half feet or ninety inches, the width of the trailer $W_T$ is four feet three inches, or fifty-three inches, the height $H_T$ (FIG. 1) of the trailer is twenty-five inches, and the length $L_{TB}$ of the towbar 120 is thirty-six inches. The distance between the front and rear tubes 24 and 26 of the main frame 22 from centerline to centerline is about forty-two inches, thereby approximately the same as the centerline-to-centerline distance between the front and rear axles of a standard adult-size bicycle, i.e., the wheel base of such bicycle. With these selected dimensions, and recognizing that the drawing FIGS. 1 through 9 are to scale, the remainder of the dimensions can readily be determined. In addition, one of the advantages of the subject trailer 20 is its relatively light weight. When the first embodiment of the trailer is constructed of steel tubing as described and is of the identified dimensions and is empty, it has a total weight of about one hundred thirty-five pounds; when it is fully loaded with five standard-size bicycles, it has a weight of approximately two hundred eighty-five pounds. If made of aluminum tubing, the weight would of course be less.

With reference to FIG. 2, when the trailer 20 is fully loaded with five bicycles 150 of standard construction, the center of gravity of the load of bicycles is approximately at point 180, which lies in the intersection of the planes containing the longitudinal center line of the trailer and the vertical plane containing the axes of the wheels 90. The center of gravity moves forwardly somewhat to point 182 if fewer bicycles are loaded on the trailer on the inside and central channels 142 and 144 or depending on the number and location of the channels 140, 142, and 144 selected for a particular trailer according to the choice of the user.

OPERATION OF FIRST EMBODIMENT

The operation of the trailer 20 is described with reference to the three principal modes of operation of the trailer, namely, the earth-traversing, parking, and stowing modes. To describe the earth-traversing mode, it is assumed the trailer is initially empty as shown in FIGS. 1 and 2. For loading or unloading purposes, the load-supporting frame 22 is either in a horizontal attitude, as shown in FIG. 1, or in a rearwardly tilted attitude or parking mode, as shown in FIG. 9. If the horizontal attitude is chosen, the towbar 120 is preferably initially coupled to the hitch of a vehicle 130, rested on some support such as a box so as to support the load-supporting frame in the horizontal attitude, or merely rested on the ground 170. As above noted, the first embodiment has a height of about twenty-five inches so with such a low profile, the trailer is easy to load, or unload, with bicycles 150, in contrast to the roof of an automobile. After each bicycle is placed in its respective channel, it is secured to the trailer by the appropriate frame or fork clamps and auxiliary clamps 154, 156, and 166, respectively, in the manner set forth above.

Figure 8:
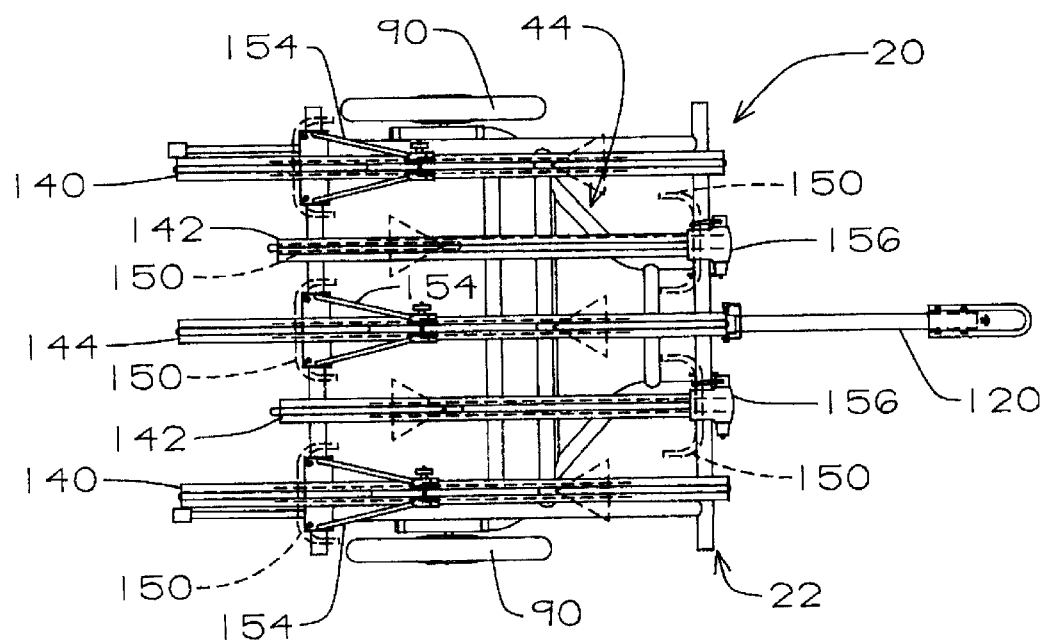
FIG. 8 is a plan view similar to FIG. 2 but showing five bicycles in phantom supported on the trailer.
Figure 9:
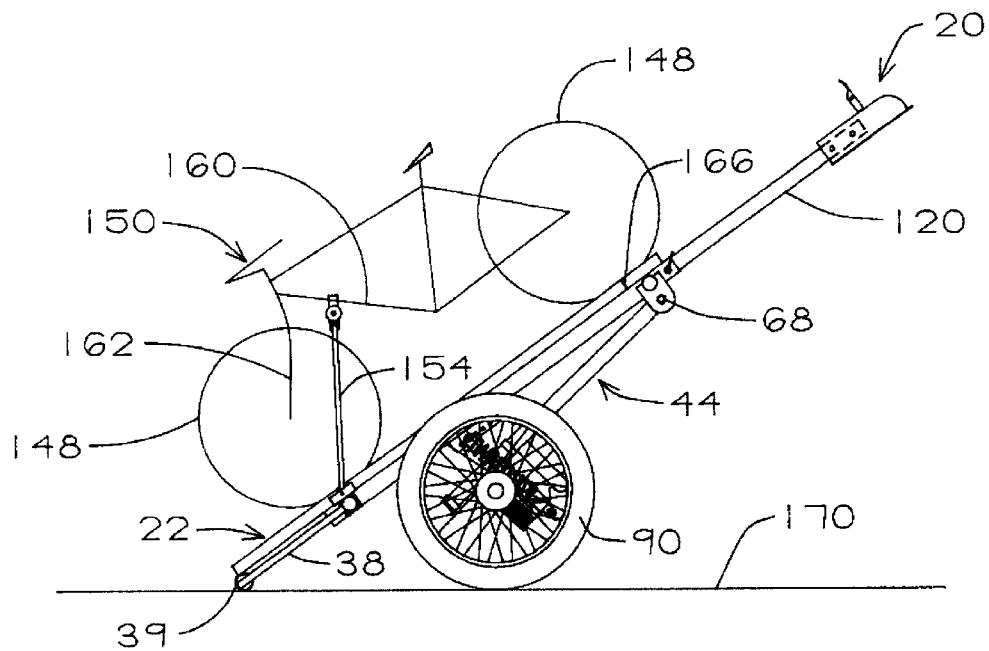
FIG. 9 is a side elevation of the trailer of FIG. 1 with a bicycle shown in phantom thereon and with the trailer in its parking mode.

Assuming that five bicycles 150 are secured on the load-supporting frame 22 as above described and shown in FIG. 8, the bicycles are thus supported in upstanding side-by-side positions and in a generally level plane, as represented by the plane of the trailer bed of the load-supporting frame, when the trailer 20 is in earth-traversing position (FIGS. 1 and 8). It is also noted that the spacing between the frames of the bicycles in adjacent channels is less than width of the handle bars of a bicycle. The center of gravity 180 is at or just forward of the axes of the wheels 90 so that the load of bicycles is well balanced. With the towbar 120 attached to the vehicle 130, the load is maintained in its substantially level position while the suspension frame 44 is allowed to move up and down relative to the load-supporting frame.

If it is desired to transport fewer than five bicycles 150, the subject trailer 20 allows bicycles to be loaded so as to maintain an appropriate balance. That is, if, for example, four bicycles are transported, they are placed in the outside and intermediate channels 140 and 142, leaving the central channel free, thereby maintaining the balance of the load on the supporting frame with the center of gravity at point 180. If three bicycles are transported, they are loaded on either the outside channels 140 and the central channel 144, or on the intermediate channels 142 and the central channel 144; in either case, the center of gravity is maintained in the region between points 180 and 182 forward of the wheel axes. If only two bicycles are transported, they are loaded on either the outside channels or the intermediate channels to maintain balance. Although not as likely, if only a single bicycle is carried, it is placed on the central channel 144. In all cases, balance is maintained and the center of gravity is between points 180 and 182.

During earth-traversing movement of the trailer 20 (FIGS. 1 and 8) with its load of bicycles 150, the load supporting frame 22 is maintained in its level position by the action of the suspension frame 44 and the shock absorber 100. If one or both of the wheels 90 encounter a rise or bump, both wheels move up and down in unison so as to maintain the supporting frame level and to minimize sway of the trailer while cornering. Also, the wish-bone or dogleg design of the suspension frame 44 magnifies the shock-absorbing characteristics of the shock absorber 100 and distributes its effect over the load-supporting frame. Thus, the bicycles are maintained substantially level in their upstanding side-by-side relation for damage-free transport at highway speeds. A particularly important advantage is that the suspension frame and shock absorber combination under the load-supporting frame avoids the worst possible suspension failure, namely, having the trailer flip over during highway travel.

Whether loaded or unloaded, tests with the trailer 20 (FIGS. 1 and 8) prove that it does not affect handling of the drawing vehicle 130 so that the driver does not feel the presence of the trailer, except as may be caused by a loose-fitting trailer hitch. With proper adjustment of the shock absorber 100, road tests also confirm that vibration or shaking of the bicycles 150 loaded on the trailer is mitigated even while transversing large bumps on secondary roads.

Assuming the trailer 20 (FIGS. 1 and 8) with a load of bicycles 150 has reached a particular destination, the subject invention allows the trailer to be disconnected from the vehicle 130 while maintaining the bicycles in their upstanding, side-by-side, secured positions. Thus, the towbar 120 is disconnected from the vehicle and manually lifted off the hitch. The trailer is relatively easy to maneuver manually with the towbar because the load is balanced on the wheels 90. The trailer can be placed in its parking position (FIG. 9) by allowing the load-supporting frame 22 to tilt rearwardly until the feet 39 on the legs 38 engage the support surface 170. Because the bicycles are secured to the channels 140, 142, and 144 by the clamps 154, 156, and 166, the bicycles will remain in their upstanding side-by-side positions. Thus, the trailer with its load of bicycles can be parked, and the vehicle 130 can be used without bicycles being attached thereto.

When it is desired to stow the trailer 20 (FIGS. 1, 2, 5, 8, and 9), any bicycles 150 thereon are first removed, and the towbar 120 is removed from the front coupling 35. The front tube 24 is then grasped and the trailer is manually tilted rearwardly on the legs 38 from the horizontal position of FIGS. 1 and 2 to the forty-five degree position of FIG. 9 to a vertical position, as shown in FIG. 5, where it can be rested against the wall 172 of a garage, bicycle shop, or other storage facility. With the trailer thus leaning against the wall, the towbar is connected to the storage coupling 134, so that the towbar forms a third leg, along with the legs 38, to provide a three-point dependable support for the trailer, that is, with the three legs thusly provided being in triangular relation to each other. Next, the quick-release clamps 80 and the retaining pins 82 are released and unlocked respectively, and the wheels 90 are pivoted into their stowing or storage positions (FIG. 5). As such, the entire trailer occupies a minimum amount of space against the wall since it projects out from the wall only approximately one-half the height of the trailer in normal use.

Figure 10:
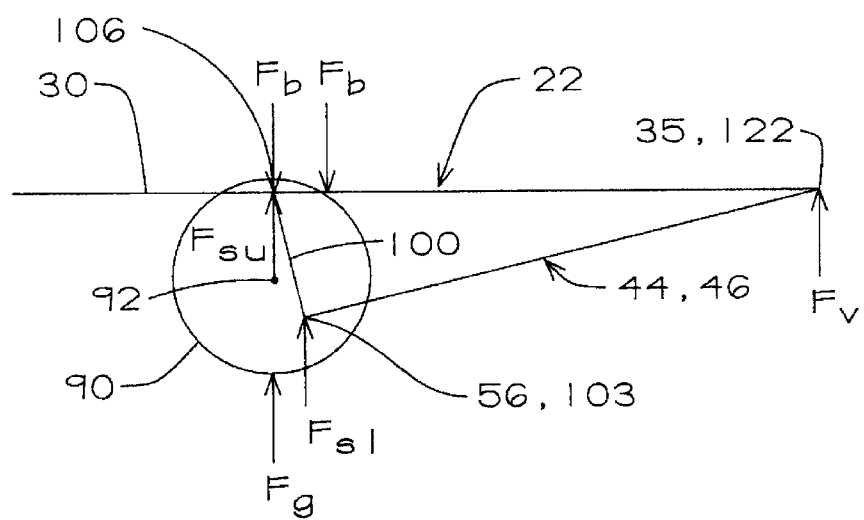
FIG. 10 is a force diagram of the trailer of FIGS. 1 through 9 in its earth-traversing mode.

With reference to the force diagram in FIG. 10, the basic forces acting on the trailer 20 in its earth-traversing mode are briefly described. Thus, the wheels 90 experience ground forces $F_g$ acting upwardly on the wheels. The ground forces $F_g$ are translated through the wheels 90 and axles 92 to the suspension frame 44 and its arms 46 where a lower shock absorber force $F_{sl}$ is applied to the shock absorber 100 at the apex 56 of the rear cross-tube 52 and pin 103. In turn, the shock absorber exerts an upper shock absorber force $F_{su}$ on the central tube 30 of the load-supporting frame 22. The upper shock absorber force $F_{su}$ is applied approximately at the center of gravity 180, 182 of the load-supporting frame but is distributed throughout the load-supporting frame. Depending on the type of load of bicycles, that is, the number of bicycles and their location on the trailer as above described, the downward force of the load $F_b$ is exerted in the region of the center of gravity 180, 182. The lifting force resulting from hitching of the trailer to a vehicle 130 is designated $F_v$.

DETAILED DESCRIPTION-SECOND EMBODIMENT

Figure 18:
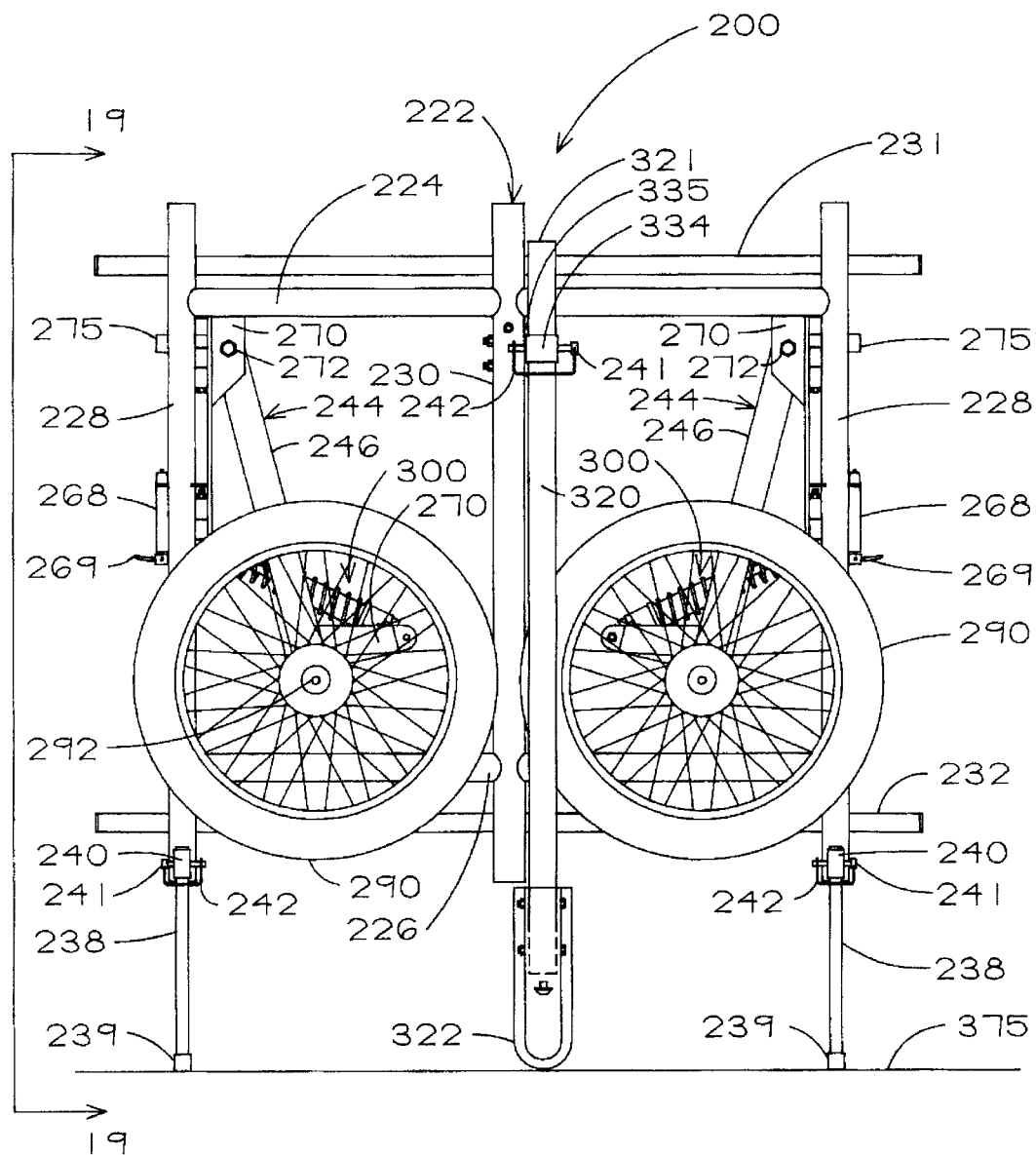
FIG. 18 is a view of the second embodiment of the trailer in its stowed or collapsed mode, similar to FIG. 5 but enlarged relative to FIG. 5.
Figure 19:
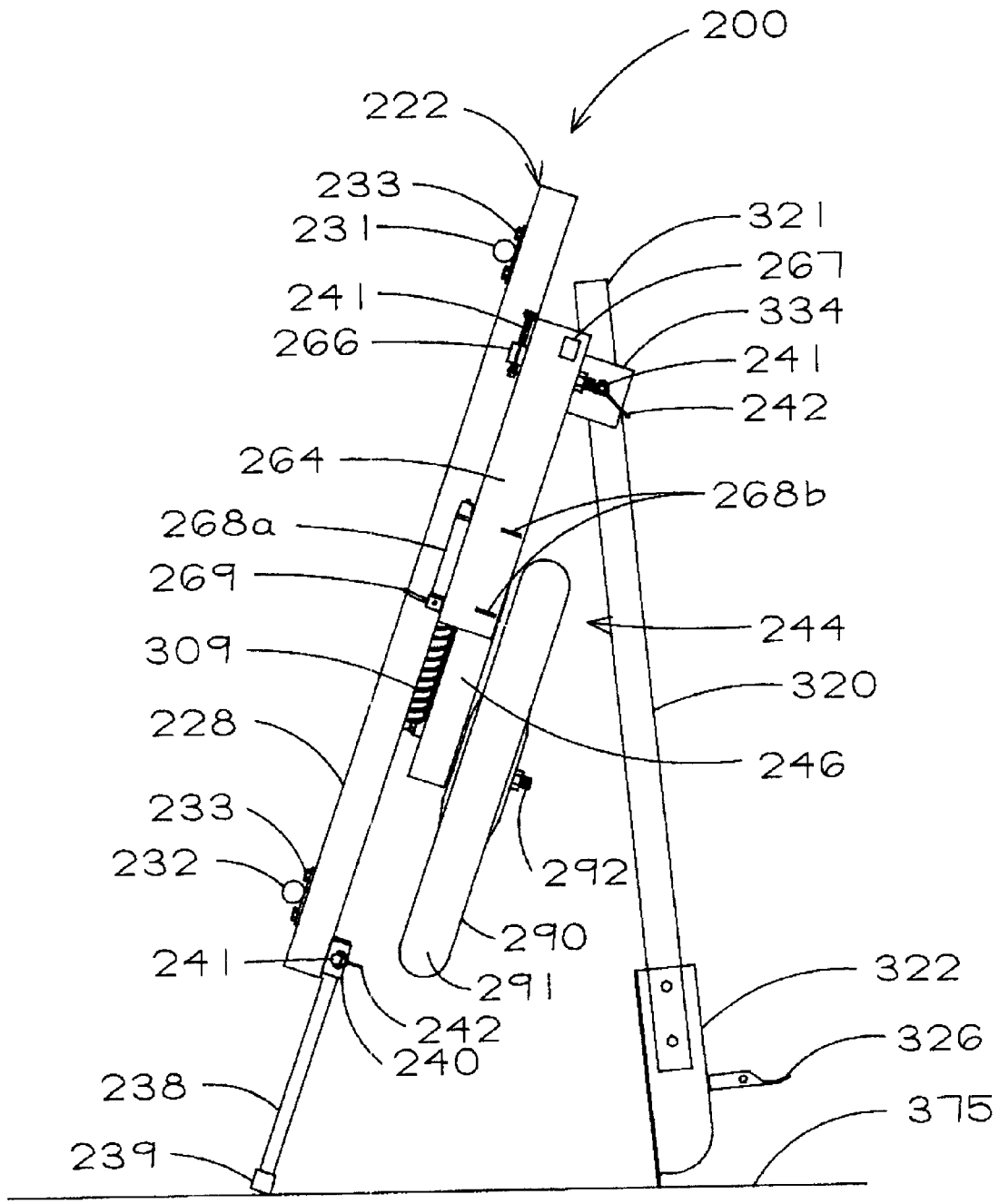
FIG. 19 is a side elevation of the second embodiment of the trailer in its stowed mode and viewed from a position indicated by arrows 19—19 in FIG. 18, it being noted that the first embodiment of the trailer would have a similar appearance had a side elevation of FIG. 5 been shown.
Figure 20:
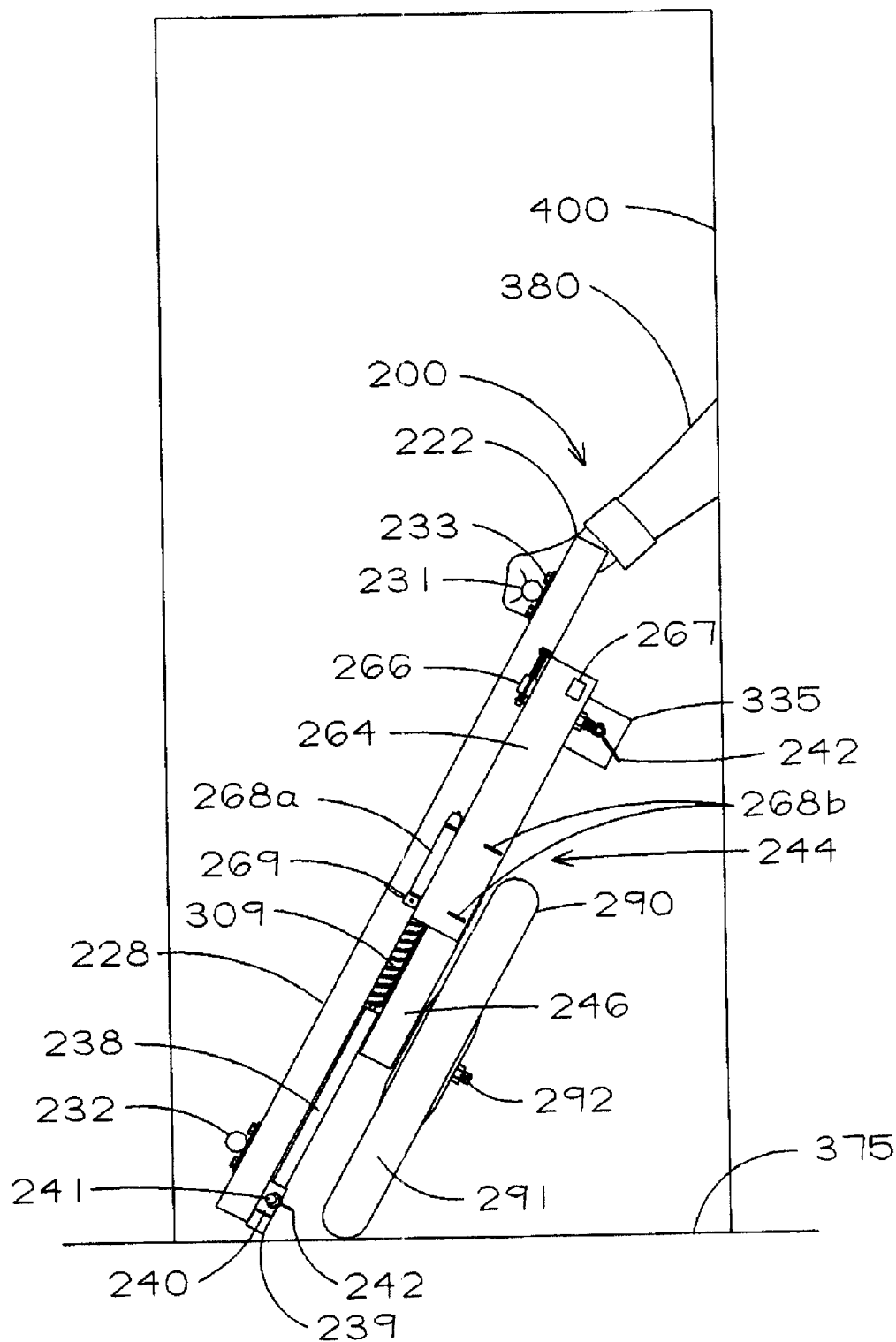
FIG. 20 is a side elevation of the second embodiment of the trailer in its rolling mode and is a view similar to FIG. 19 but with the stowing legs retracted and the towbar removed so as to condition the trailer for rolling on its wheels sideways through narrow passageways, such as a standard doorway indicated in outline in FIG. 20.

Referring to FIGS. 11 through 20, a second and preferred embodiment of a trailer constructed in accordance with the principles of the present invention is identified by the numeral 200. As with the first embodiment, the trailer 200 is operable in several different modes or conditions, namely, an earth-traversing mode (FIGS. 11 through 13), a stowing mode (FIGS. 18 and 19), and a parking mode, not specifically shown, but the same as in FIG. 9. In addition, the trailer 200 has a collapsed, rolling mode, as shown in FIG. 20. For the most part, the attitudinal references used to describe the trailer assume the earth-traversing mode since this is its principle mode of use. The first and second embodiments have much in common, so that the reference numbers of most of the similar or related parts are related, that is, the number 20 identifies the trailer of the first embodiment, and the number 200 identifies the trailer of the second embodiment.

Figure 11:
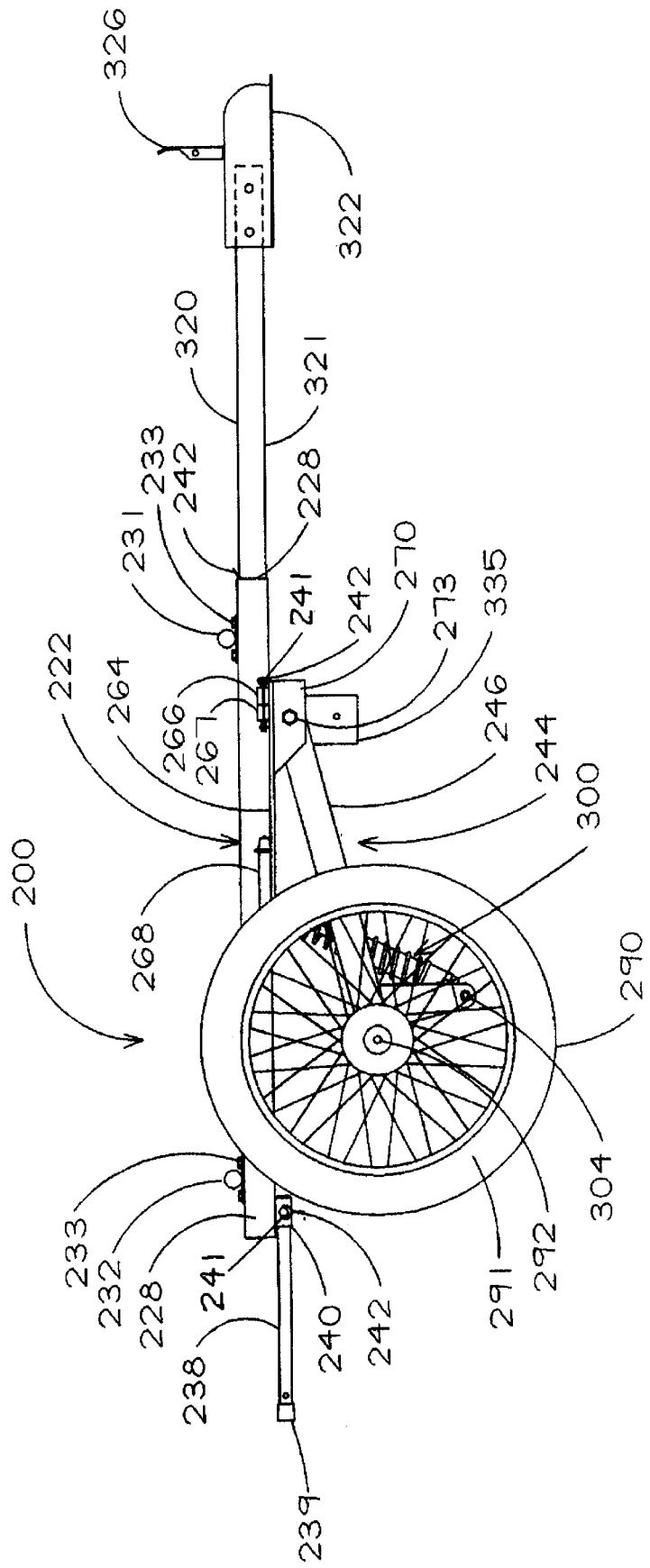
FIG. 11 is a side elevation of a second and preferred embodiment of the subject trailer in its earth-traversing mode except that the storing legs are extended, it being noted that the trailer is shown enlarged in FIG. 11 compared to FIG. 1, although the first and second embodiments of the trailer are of generally the same size in actual construction.
Figure 12:
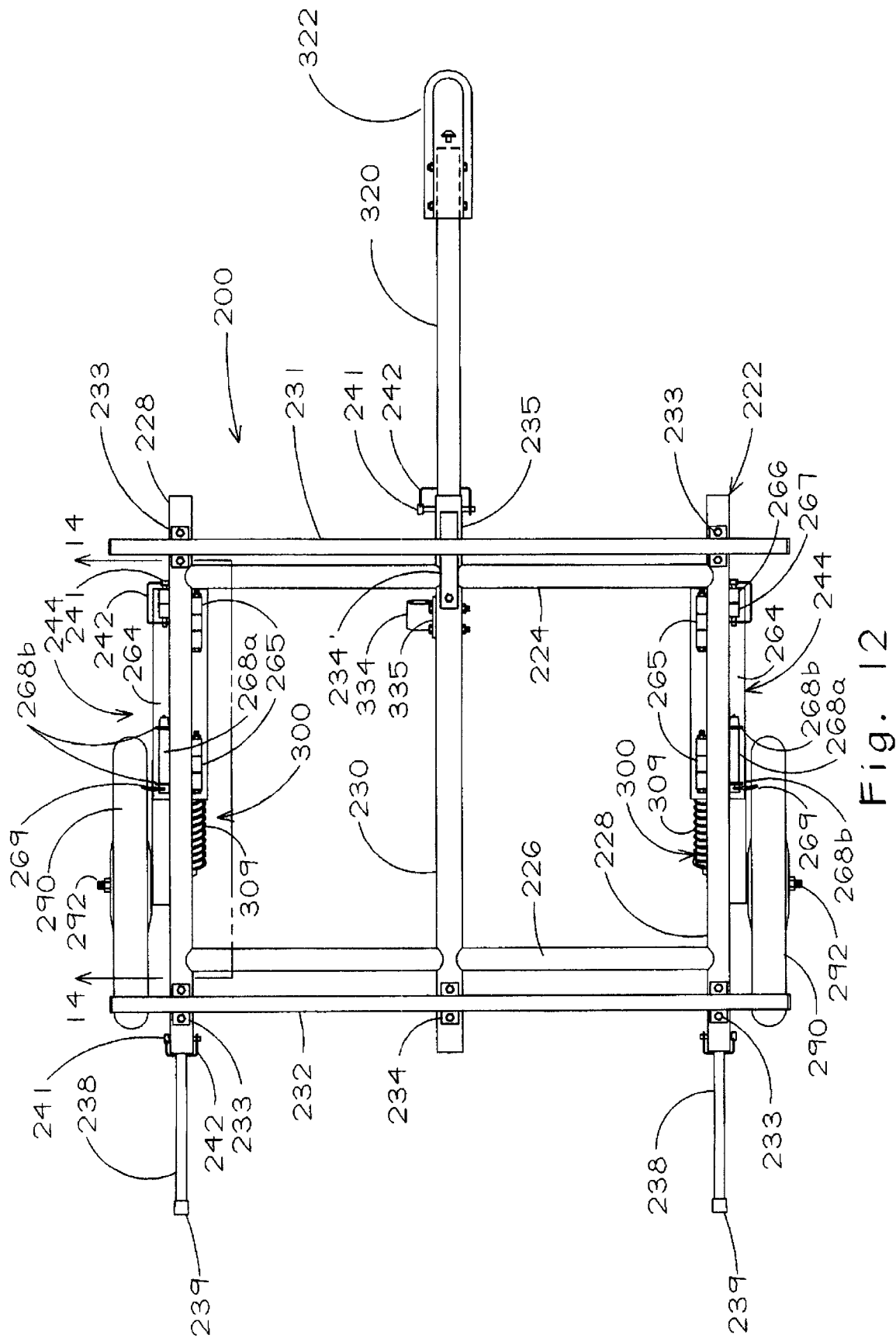
FIG. 12 is a top-plan view of the trailer shown in FIG. 11.
Figure 13:
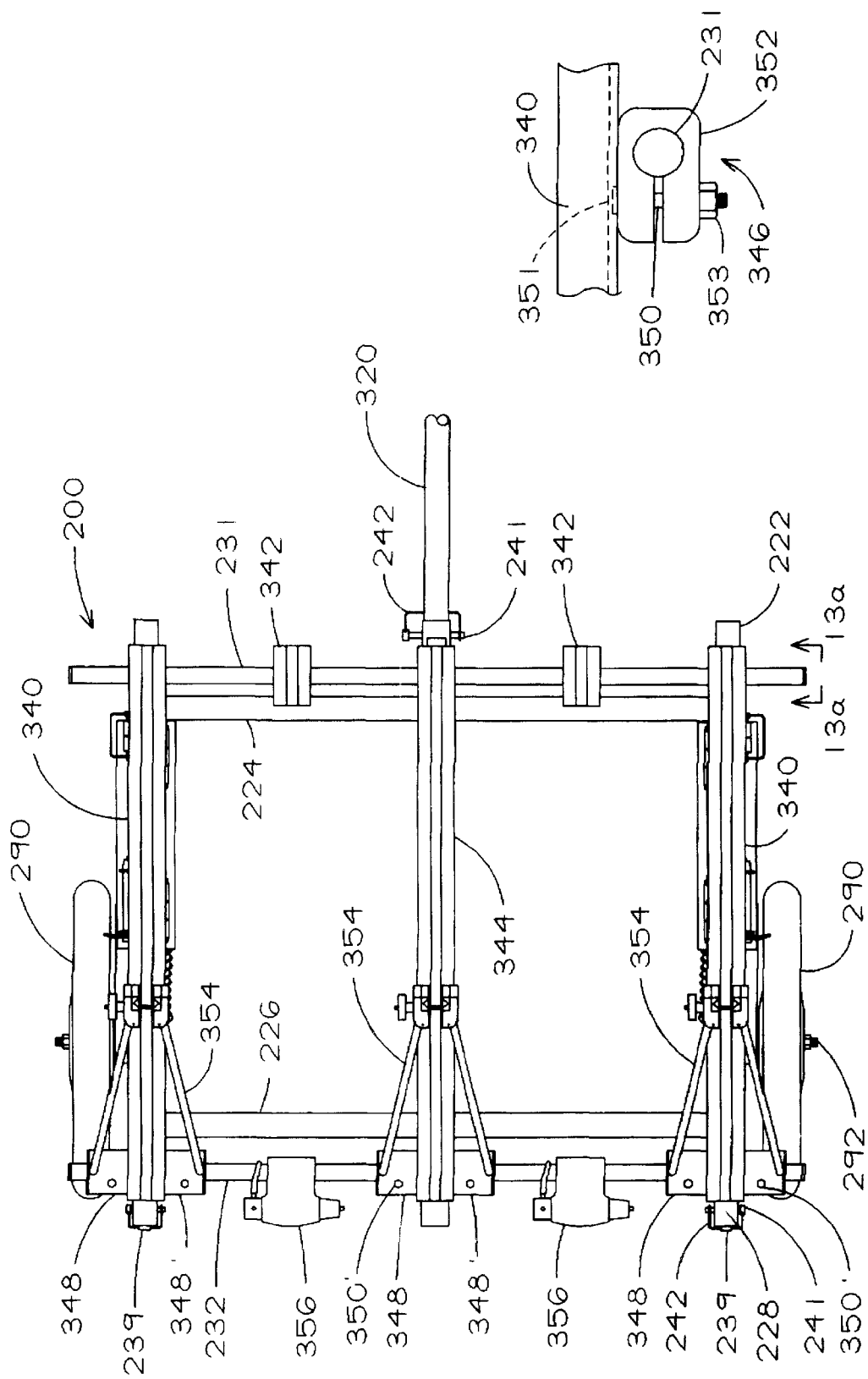
FIG. 13 is a fragmentary plan view of the trailer of FIGS. 11 and 12 but showing channels and clamps for attaching bicycles to the trailer similar to FIG. 8 and also showing the stowing legs retracted.

The trailer 200 (FIGS. 11, 12, and 13) includes an upper load supporting or main frame 222 preferably of steel tubing to minimize cost but of aluminum if lighter weight is desired. The main frame is preferably rectangular, essentially square, and is composed of straight, coplanar, front, rear, and side tubes 224, 226, and 228 connected in a generally square shape in plan view, as best seen in FIGS. 12 and 13. It is to be understood that the precise shape of the frame is not critical since shapes other than rectangular may be employed, such as an A-frame for example. The main frame also includes a longitudinal central tube 230 interconnecting the front and rear tubes and coplanar therewith.

The central tube 230 (FIGS. 12 and 13) defines a longitudinal axis which is an axis of symmetry for the main frame 222 as well as the trailer 200 as a whole and terminates in a front towing socket or coupling 235. The side tubes 228 have opposite ends which extend fore and aft of the front and rear tubes 224 and 226, respectively, as best seen in FIG. 12.

Front and rear mounting tubes 231 and 232 (FIGS. 11 and 12) are part of and extend transversely of the main frame 222. These mounting tubes, however, are releaseably attached to the fore and aft extensions of the side tubes 228 by corner brackets 233 and to the central tube 230 by center brackets 234 and 234'. The brackets are welded to the mounting tubes and attached to the side and central tubes by nuts and bolts or other suitable fasteners. The mounting tubes are coplanar as shown in FIG. 11 and thus define a trailer bed of a greater expanse than the tops of the front, rear, side and central tubes 224, 226, 228 and 230 but are detachable for shipping purposes. In other words, the outside dimensions of the integrally connected front, rear and side tubes are the maximum dimensions currently accepted for shipping by the United Parcel Service. Yet, to carry the desired load of bicycles, greater outside dimensions are desired, and these greater dimensions are provided by the mounting tubes.

Main stowing legs 238 are telescopically slideably received in sleeves 240 welded under and to the rear ends of the side tubes 228. The legs are thus movable between extended positions projecting rearwardly from the side tubes, as shown in FIGS. 11 and 12, and retracted positions within the side tubes, as shown in FIG. 13. Rubber feet 239 are preferably fitted over the ends of the legs. Pins 241 and U-shaped safety springs 242 retain the legs in their extended or retracted positions, as selected.

Figure 17:
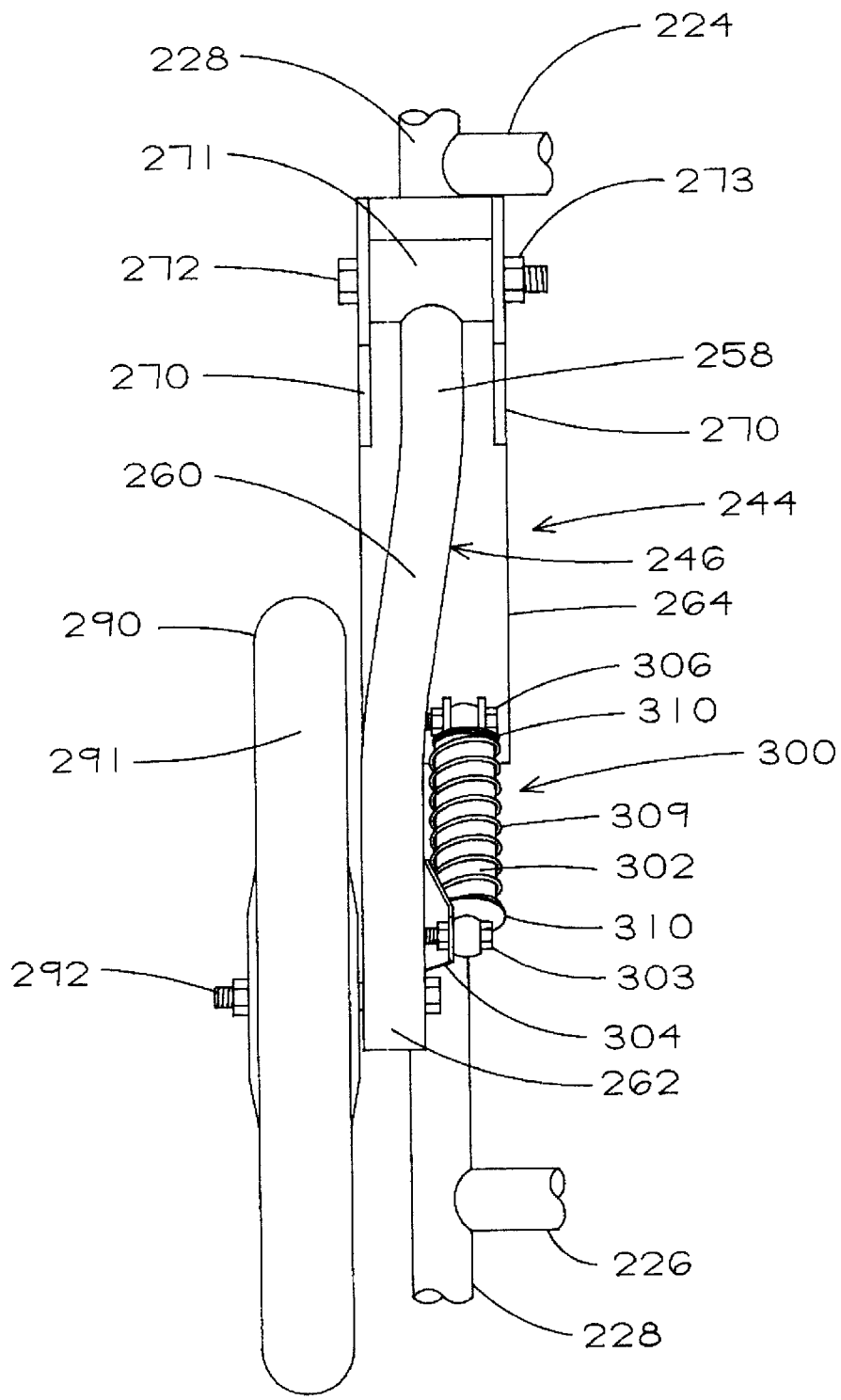
FIG. 17 is an enlarged fragmentary, bottom plan view looking up in the direction of arrows 17—17 in FIG. 14.

The trailer 20 also has a high performance suspension system including a pair of suspension units 244 (FIGS. 11 and 14 through 17) individually suspending or supporting opposite sides, that is, the side tubes 228, of the main frame 22. Each suspension unit provides a suspension arm 246 preferably of steel tubing like the main frame but of aluminum if desired. Each suspension arm is curved, as best seen in FIG. 17, and includes a straight front portion 258 that is coplanar with and under its respective side tubes, a rearwardly and outwardly extending intermediate portion 260, and a straight rear portion 262 that is parallel to the front portion but is partially outwardly offset from its respective side tube. It is thus seen that the suspension arms 246 have curvatures generally similar to the suspension arms 46 of the first embodiment.

Each suspension unit 244 also includes a rectangular suspension plate 264 (FIGS. 11, 12, and 14 through 17) located under its respectively adjacent side tube 228 and hinged to its respective side tube by front and rear inside hinges 265 on the side tube and plate. As best seen in FIG. 12, the hinges are on the inboard sides of the side tubes 228. These hinges allow each suspension plate to be pivoted between a running position (FIG. 15) directly under and against its respective side tube and a stowing position (FIG. 16) perpendicular to the running position and inwardly offset from its respective side tube.

Each suspension unit 244 also has a stationary front, outside latching sleeve 266 (FIGS. 11, 12, and 14 through 17) secured to the outboard side of its respective side tube 228 on the opposite side thereof from the hinges 265 and a movable front latching sleeve 267 secured to each suspension plate 264 in a position to align coaxially with the stationary latching sleeve in the running position of the suspension plate. Pins 241 extend through the aligned sleeves and are releaseably retained there by safety springs 242. In addition, each suspension unit has a stationary, rear, outside locking sleeve 268 secured to the outboard side of its respective side tube in coaxial alignment with its respective front, stationary latching sleeve. Movable rear locking eyelets 268*b* are attached to the associated suspension plate so as to align with opposite ends of their respective stationary locking sleeves in the running positions of the suspension plates. Quick-release locking bolts 269, such as Sachs quick-release fasteners, are inserted in the aligned locking sleeves and eyelets thereby dependably but releasably locking the suspension plates in their running positions. Stops 275 (FIGS. 15 and 16) project inwardly from the inboard sides of the side tubes for engagement with the suspension plates to limit movement thereof in their stowing positions.

Further, each suspension unit 244 has transversely spaced mounting brackets 270 (FIGS. 11 and 14 through 17) that depend from the front end of its respective suspension plate 264 in its running position. A bushing 271 is rotatably mounted between each pair of brackets on a bolt 272 that extends through its associated bushing and brackets, and a nut 273 is threaded on each bolt. The front portions 258 of the suspension arms 246 are welded to their respective bushings for pivotal movement of the arms on the bolts so that the arms can move elevationally relative to the side tubes 228 in the running positions of the suspension plates.

Trailer wheels 290 (FIGS. 11–14 and 17) having tires 291 and axles 292 are individually rotatably mounted on the rear portions 262 of the suspension arms 246 of the suspension units 244 with the axes of the wheels perpendicular to the rear portions 262. In addition, because of their mounting on the suspension arms and plates 264, the wheels are pivotally or rotationally movable relative to the side tubes 228. The wheels can thus be moved between vertical, earth-traversing positions generally parallel to and coaxial with each other and disposed outwardly of their respective side tubes, as shown in FIGS. 11 through 14 and 17, and stowing positions generally coplanar with each other and disposed under and generally parallel to the main frame 222, as shown in FIGS.

18 through 20. Although the earth-traversing position of the wheels is substantially vertical, the exact attitudes of their stowing position is not critical; the wheels as well as other corresponding parts of the suspension units 244 may be coplanar, as illustrated in FIGS. 18 and 20, or they may be in obtusely related planes, not shown, in the stowing positions. It is also noted that the tires of this second and preferred embodiment are somewhat wider than the tires on the wheels 90 of the first embodiment. The tires are made wider to counteract for the use of independent suspension as contrasted with the unified action of the suspension frame 44 that minimizes sway on cornering. As an example of a suitable width of the tires 91, but not limiting the invention, it has been determined that a width of about three inches provides excellent results.

Each suspension unit 244 also includes a single heavy duty shock absorber 300 (FIGS. 11, 12, 14, 17, and 18) preferably of the type commonly used in motorcycles. Thus, each shock absorber includes an hydraulic cylinder 302 having a lower end releasably pivotally attached by a lower pin 303 to a lower suspension bracket 304. This bracket (FIGS. 14 and 17) projects downwardly and inwardly from the rear portion 262 of its respective suspension arm 246 and under the adjacent side tube 228 in the running position of the respective suspension plate 264. These brackets are functionally related to the rear transverse tube 52 of the first embodiment, as will be seen. Each shock absorber (FIGS. 14 and 17) also includes a piston rod 305 having an upper end releasably pivotally connected by an upper pin 306 to an upper bracket 308 attached to the underside of the associated suspension plate 244 at its rearward end. Also, each shock absorber includes a coiled compression spring 309 around the cylinder and piston rod and having opposite ends bearing against upper and lower stops 310. Although one spring is shown on each shock absorber, dual springs with progressive spring weights are preferred. Examples of suitable shock absorbers are given in connection with the first embodiment described above, but the shock absorbers 300 used on the preferred embodiment are general purpose, motorcycle-type, regular coil-over shocks each with an eye-to-eye (pivot pin 303 to pivot pin 308) dimension of about thirteen inches and with dual progressive spring weights having a 100 to 140 spring weight ratio. These specific spring characteristics are as example only, it being understood that the invention is not limited to such specific characteristics.

It is again emphasized that a heavy duty shock absorber as 300 is essential to the practicality of a trailer as 200 for carrying loads such as bicycles 150. As previously explained, simple coil or leaf springs are totally ineffective for providing the necessary stability to the trailer and its load. A trailer with only a coil spring or leaf spring as the suspension would bounce along the highway like a pogo-stick and be very prone to flipping over during high speed travel.

Figure 14:
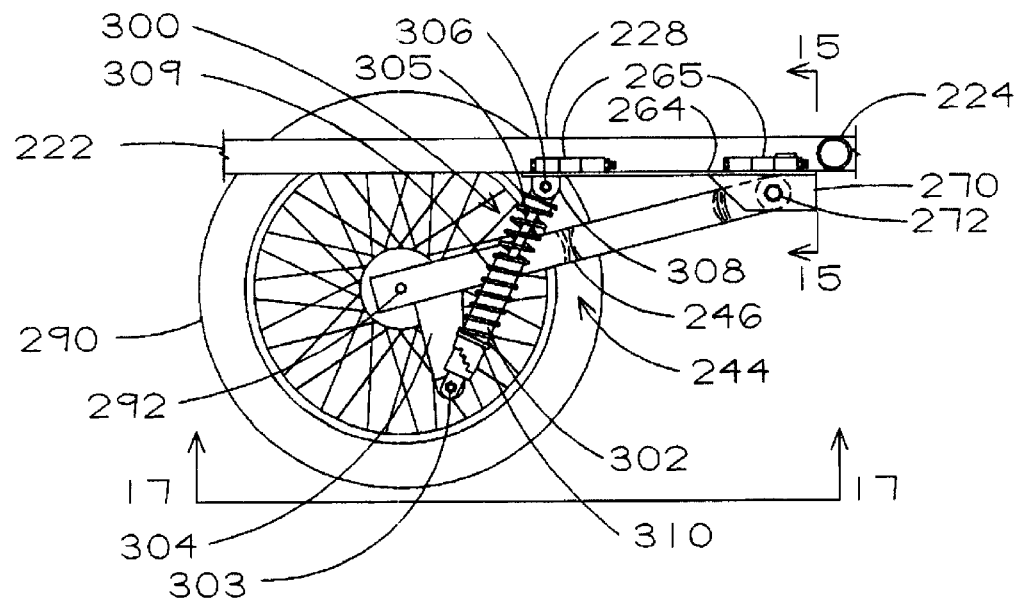
FIG. 14 is a fragmentary longitudinal vertical section taken on line 14—14 in FIG. 12.
Figures 15, 16:
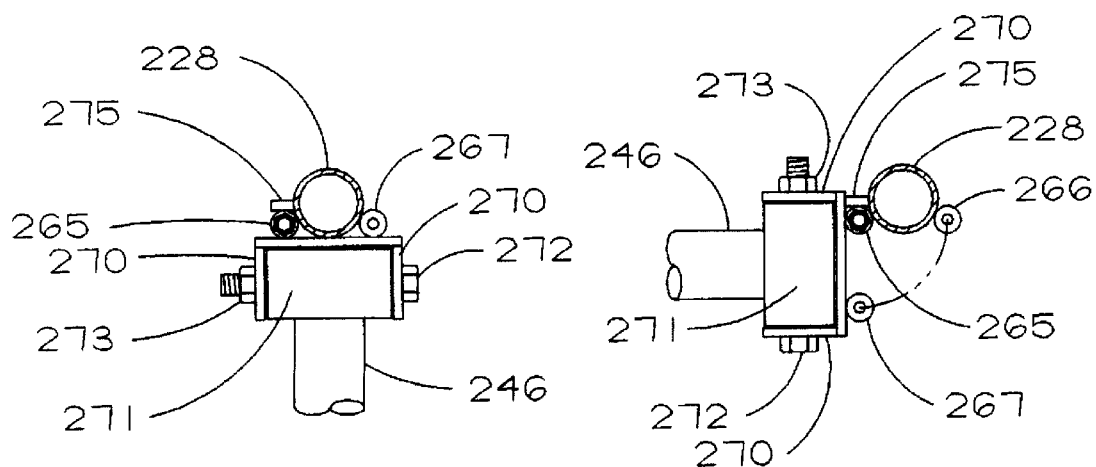
FIG. 15 is an enlarged, transverse, fragmentary section taken on line 15—15 in FIG. 14 and showing one of the suspension arms in its earth traversing position.
FIG. 16 is a view similar to FIG. 15 but showing the suspension arm in retracted or stowed position.

Because of its typical length, however, an acceptable heavy-duty shock absorber with hydraulic damping cannot be fitted directly between the suspension arms 246 and plates 264. In the preferred embodiment, and similar to the first embodiment, the lower end of each shock absorber 300 (FIGS. 11, 14, and 17) is attached to its suspension bracket 304 and thus to its suspension arm 246 at a point, represented by lower pin 303, that is both inwardly and below the suspension arm, and even below the level or horizontal plane of the axle 292 of the wheel 290, assuming the running positions of the suspension plates 264 (FIGS. 14 and 17). The upper pin 306 also connects the upper end of the shock absorber to its suspension plate 264, i.e., to the main frame 222, forwardly of the wheel axles at a point, represented by the upper pins 306, that yields the optimum suspension.

Furthermore, with reference to FIG. 17 and still assuming the running positions of the suspension plates 264, the relationship of each associated suspension arm 246 and plate 264 and their associated wheel 290 and shock absorber 300 is to be noted. By providing the suspension arm with an outward curvature and the suspension bracket 304 with an inward bend, the arm and its shock absorber do not interfere, while at the same time the shock absorber is able to maintain maximum leverage on its suspension plate and respective side tube 228 and thereby most efficiently suspend the main frame during earth traversal. In addition, the described interrelation of parts allows pivoting of each suspension unit 244 between an earth-traversing position with its wheel vertically disposed outwardly of the main frame and a stowing position with its wheel tucked under the main frame without interference of the parts. As alluded to above, the curved arms 246 and inwardly extending brackets 304, like their counterpart arms 46 and rear tube 52 in the first embodiment, allow freedom of movement of the shock absorbers, the wheels, and the arms without interference with each other so as to provide maximum effect of the suspension system.

A towbar 320 (FIGS. 11 through 13) has a rear end 321 releasably insertable into and connectable to the front towing socket or coupling 235 and a front end 322. A pin and safety spring 241, 242 releasably secures the rear end of the towbar to the socket, and a latch 326 releasably connects the front end to the hitch of a vehicle, not shown, in the earth-traversing mode of the trailer 20. A tubular stowing coupling 334 (see especially FIG. 12) is affixed to the central tube 230 of the main frame 222 by a mounting flange 335 and extends angularly downwardly therefrom in the earth traversing mode of the trailer. The rear end of the towbar is also releasably insertable into and connectable to the stowing coupling by a pin 241 and safety spring 242 (FIGS. 18 and 19) for stowing the trailer in a manner to be more specifically described hereinafter.

The manner of supporting bicycles 150 on the trailer 200 is similar to that described for the first embodiment of the trailer 20. With reference to FIG. 13 and 13a, outside, intermediate and central, upwardly opening bicycle channels or rails 340, 342, and 344 extend lengthwise or fore and aft of the trailer 200 and are releasably secured by suitable front and rear channel fasteners 346 and 348 to the front and rear mounting tubes 231 and 232 of the main frame 222. These fasteners are well known in the art and so are only briefly described here. Thus, each front fastener is as shown in FIG. 13a and includes a vertical mounting bolt 350 whose head 351 is slidably received in a longitudinally extending, downwardly facing, horizontal slot in and underneath the channel 340 for adjustment lengthwise of the channel. A C-clamp 352 is clamped on the front mounting tube 231 and has horizontal legs that slidably receive the shank of the mounting bolt. A nut 353 is threaded on the bolt for releasably tightening the clamp and securing the clamp up against the channel. The rear channel fasteners 348 are similar in construction although they include horizontal plates 348' from which rear mounting bolts 350', like the front mounting bolts 350, are suspended and releasably secure the rear fasteners to the rear mounting tube 232.

Again, the outside and central channels 340 and 344 (FIG. 13) are relatively long to accommodate longer bicycles 150 whereas the intermediate channels 342 are shorter for shorter bicycles, but such lengths may be varied as desired.

As before, the channels are preferably substantially uniformly, transversely spaced on the main frame 222. The channels are releasably secured to the main frame by the channel fasteners 346 and 348 and the mounting tubes 231 and 232 primarily to enable shipping and assembly in a kit form and to facilitate replacement or change of the channels.

In order to secure the bicycles 150 to the trailer 200, bicycle frame clamps 354 are attached to the rear channel fasteners 348, and bicycle fork clamps 356 are attached to the rear mounting tube 232, for use in association with the various channels 340, 342 and 344 in a manner believed to be well understood. It is to be noted, however, that the fork clamps may be attached to the mounting tube by fasteners similar to channel fastener 346. As with the first embodiment, preferably three frame clamps are pivotally mounted for use with the outside and central channels, and two fork clamps are mounted for use with the intermediate channels, although this arrangement may be varied as before. Again, a plurality (five in the disclosed embodiment) of bicycles can be mounted and secured in upstanding, spaced, side-by-side positions on the trailer 200. Bicycles are not shown in the drawings on the second or preferred form of the trailer 200, but by looking at FIG. 8 and FIG. 13, it can be understood how the bicycles would mount on the channels of the preferred embodiment. The outside and central channels 340 and 344 are equivalent to the outside and central channels 140 and 144, and the frame clamps 354 function like the frame clamps 154, so that bicycles mounted in the outside and central channels 340 and 344 would look just like the bicycles shown in FIG. 8 in the outside and central channels 140 and 144. Bicycles mounted in the intermediate channels 342 would look very nearly like the bicycles in the intermediate channels 142 of FIG. 8 except that they would be reversed end-for-end from those shown in FIG. 8 since the frame clamps 156 are at the front of the trailer 22, whereas the frame clamps 356 are at the rear of the trailer 222. Although long channels 142 are shown in the first embodiment and short channels 342 are shown for the preferred embodiment as illustrated, either long or short channels may be used as previously explained.

As with the first embodiment, the invention embodied in the trailer 200 is not limited to any particular dimensions, but certain dimensions of the preferred embodiment are now set forth by way of example only. Thus, the length of the side tubes 228 is about forty and one-half inches and their spacing center-to-center is about thirty-nine and one-half inches, the height of the trailer bed off the ground is about twenty-five inches, and the length of the towbar 320 is about thirty-six inches. Also, the distance between the front and rear mounting tubes 231 and 232 from centerline to centerline is about forty-two inches, which is approximately the centerline-to-centerline distance between the front and rear axle of a standard adult-size bicycle, i.e., the wheel base of such bicycle. With these selected dimensions, and recognizing that the drawing FIGS. 11 through 20 are also to scale, the remainder of the dimensions can readily be determined. In addition, when the preferred embodiment of the trailer is empty, it has a total weight of about one hundred fifty pounds and when it is fully loaded with five standard-size bicycles, it has a weight of approximately three hundred pounds.

With reference to FIG. 11, when the trailer 200 is fully loaded with five bicycles, as 150, of standard construction, the center of gravity of the load of bicycles is forwardly of the axles 292 and in a plane containing the longitudinal center line of the trailer. The center of gravity moves forwardly somewhat if fewer bicycles are loaded on the trailer or depending on the number and location of the channels 340, 342, and 344 selected for a particular trailer according to the choice of the user.

OPERATION OF SECOND EMBODIMENT

The operation of the trailer 200 is described with reference to the four modes of operation of the trailer, namely, the earth-traversing, parking, stowing, and rolling modes. To describe the earth-traversing mode, it is assumed the trailer is initially empty. For loading or unloading purposes, the main frame 222 is either in a horizontal attitude, as shown in FIG. 11, or in a rearwardly tilted attitude, not shown but similar to FIG. 9. If the horizontal attitude is chosen, the towbar 320 is preferably initially coupled to the hitch of a vehicle, as 130, rested on some support such as a box so as to support the load-supporting frame in the horizontal attitude, or merely rested on the ground. As above noted, the preferred embodiment has a height of about twenty-five inches so with such a low profile, the trailer is easy to load, or unload, with bicycles, as 150, in contrast to the roof of an automobile. After each bicycle is placed in its respective channel, it is secured to the trailer by the appropriate frame or fork clamps and auxiliary clamps 354 or 356 in the manner previously described.

Assuming that five bicycles, as 150 (FIGS. 11 and 13), are secured on the trailer 200, the bicycles are thus supported in upstanding, transversely spaced, side-by-side positions (like FIG. 8) and in a generally level plane, as represented by the plane of the trailer bed of the main frame 222, when the trailer is in its earth-traversing position. Again, the spacing between the frames of the bicycles in adjacent channels 340, 342, 344 is less than the width of the handle bars of a bicycle. The center of gravity is just forward of the axes 292 of the wheels 290 so that the load of bicycles is well balanced. With the towbar 320 attached to a vehicle, as 130, the load is maintained in its substantially level position while the wheels are allowed by the pivotal suspension arms 246 to move up and down relative to the main frame as the trailer moves over the ground or along the highway.

If it is desired to transport fewer than five bicycles, as 150, the subject trailer 200 also allows bicycles to be loaded so as to maintain an appropriate balance. That is, if, for example, four bicycles are transported, they are placed in the outside and intermediate channels 340 and 342 (FIG. 13) leaving the central channel 344 free, thereby maintaining the balance of the load on the main frame 222 with the center of gravity as indicated. If three bicycles are transported, they are loaded on either the outside channels 340 and the central channel 344, or on the intermediate channels 342 and the central channel 344; in either case, the center of gravity is maintained in substantially the same region forward of the wheel axes 292. If only two bicycles are transported, they are loaded on either the outside channels or the intermediate channels to maintain balance. Although not as likely, if only a single bicycle is carried, it is placed on the central channel 344. In all cases, balance is maintained with the center of gravity just forward of the axles.

During earth-traversing movement of the trailer 200 with its load of bicycles, as 150, the main frame 222 is maintained in its level position by the action of the suspension units 244 including especially the shock absorbers 300. With independent suspension of opposite sides of the main frame on the wheels 290, each wheel and its suspension arm 246 is allowed to move elevationally independently of each other, as one wheel or the other rises or drops, so as to maintain the main frame level.

A major advantage of this high performance suspension system 244 is its ability to maintain traction of the wheels 290 with the ground and minimize or avoid bouncing. Although the main frame may move elevationally, extensive tests have shown that the shock absorbers 300 keep the wheels on the ground. Thus, the bicycles 150 are maintained substantially level in their upstanding side-by-side relation for damage-free transport at highway speeds. As before, the suspension system of the preferred embodiment avoids the worst possible suspension failure, namely, having the trailer flip over during highway travel. Although the wishbone suspension frame 44 of the first embodiment may minimize sway on cornering better than the independent suspension, as above noted the wheels 290 of the preferred embodiment are wider than the wheels 90 of the first embodiment thereby mitigating the problem of sway with independent suspension.

Whether loaded or unloaded, tests with the trailer 200 again prove that it does not affect handling of the drawing vehicle, so that the driver does not feel the presence of the trailer except if coupled by a loose-fitting trailer hitch. With proper adjustment of the shocks 300, road tests also confirm that vibration or shaking of the bicycles loaded on the trailer 200 is mitigated even while traversing large bumps on secondary roads. The force diagram of FIG. 10 applies as well to the trailer 200 in its earth-traversing mode as previously described for the first embodiment.

Assuming the trailer 200 with a load of bicycles, as 150, has reached a particular destination, the subject invention allows the trailer to be disconnected from the vehicle, as 130, while maintaining the bicycles in their upstanding, side-by-side, secured positions. Thus, the towbar 320 is disconnected from the vehicle and manually lifted off the hitch. The trailer is relatively easy to maneuver manually with the towbar because the load is balanced on the wheels 290. The trailer can be placed in its parking mode (like FIG. 9) by allowing the main frame 222 to tilt rearwardly until the feet 239 of the legs 238, preferably in their retracted positions, engage the support surface 375. Because the bicycles are clamped to the channels 340, 342, and 344, the bicycles will remain in their upstanding side-by-side positions. Thus, the trailer with its load of bicycles can be parked, and the vehicle can be used without bicycles being attached thereto.

When it is desired to store the trailer 200, bicycles thereon are first removed, and the trailer is preferably manually maneuvered by the towbar 320 and backed up close to a wall. The towbar 320 (FIGS. 11 and 12) is then removed from the front coupling 235, and the legs 238 are pulled out and secured in their extended positions. The front tube 224 or the mounting tube 231 is grasped and the trailer is manually tilted rearwardly on the legs until it is in a vertical position, as can be visualized by looking at FIG. 18, although FIG. 18 is intended to show the trailer 200 inclined as in FIG. 19. From a vertical position, the trailer can then be gently leaned back against a wall of a garage, bicycle shop or other storage facility. Next, the quick-release locking pins 269 and the safety springs 242 and latching pins 241 are released, and the wheels 290 are pivoted into their stowing or storage positions as also shown in FIG. 18. The trailer can thus be compactly stored leaning against a wall as described. It is to be reiterated that such a leaning, stored position is not actually shown in FIG. 18 since in such a leaned-back position, the top (i.e., actually the front to use the terminology previously employed) of the trailer in FIG. 18 would be leaned back into the page, as it were, relative to the feet 239, and the towbar 320 would not normally be connected to the stowing coupling 334 but instead laid down on the floor next to the trailer.

The trailer 200, however, provides its own independent support for compact storage purposes, as did the trailer 20, and such independently supporting condition is shown in FIGS. 18 and 19. Such an independently supporting condition is best achieved by first leaning the trailer against a wall as above described. The rear end of the towbar 320 is then slid into the storage coupling 334 and connected thereto by a pin 241 and spring 242, with the front end 322 down. The trailer is then tilted forwardly until the front end of the towbar contacts the floor 375, so that the towbar forms a third leg, along with the legs 238, to provide a three-point dependable tripod support for the trailer. As will be understood, the legs may be retracted so that the side tubes 228 (and central tube 230 too although unnecessary for supporting purposes) serve as the first and second legs along with the towbar as the third leg to provide the tripod support. As such, the entire trailer occupies a minimum amount of space independently supported but usually adjacent to a wall since the trailer projects out from the wall only approximately one-half the height of the trailer in normal use. The stowing mode of the trailer thus provides for wall support or independent support.

With reference to FIG. 20, an important feature of the preferred embodiment is shown. Although the unloaded trailer 200 is relatively lightweight insofar as trailers go, its weight of about one hundred fifty pounds unloaded is still significant, especially for one person to lift. When the trailer is in its earth-traversing mode (FIG. 11), and because of its balance, one person can easily maneuver the trailer by the towbar 320 to the limited degree usually necessary, whether loaded or unloaded. However, because of the trailer's width, it cannot be maneuvered through a doorway of normal width, such as might be desired at a bicycle shop. When the trailer is unloaded, one person can also fairly readily tilt the trailer upwardly on its legs 238 (FIG. 18) for stowing purposes as described. When the trailer is in its stowing mode (FIGS. 18 and 19), however, it is difficult, and perhaps impossible, for an average person to move the trailer around, for example in a garage or bicycle shop, as by lifting. The trailer is too heavy to lift and move, and the legs 238 (or the side and central tubes 228 and 230) and 320 do not lend themselves to sliding of the trailer over the ground, floor, or pavement. Moreover, the trailer is too wide when expanded to fit through a door. To solve these problems, the trailer has a sideways rolling mode, as now described.

Accordingly, mobility of the trailer 200 and through relatively narrow passageways by one person is achieved by retracting the legs 238 and removing the towbar 320 so that the trailer can be rested and balanced on the wheels (FIG. 20) in its so-called rolling mode. Here it is to be recognized that the suspension arms 246 position the wheels 290 so that their rearward peripheries are almost at the rearward extremities of the side and central tubes 228 and 230 and the feet 239 when the legs 238 are fully retracted. As shown in FIG. 20 (and as can be visualized in FIG. 18), the side tubes and feet project rearwardly (downwardly in FIGS. 18 and 20) of the wheels by a few inches, about two to three inches. As such, the trailer can be rested on the wheels while assuming an upright attitude as shown in FIG. 20, albeit inclined about thirty degrees off a purely vertical position. In this mode, one person whose arm is indicated at 380, can grasp the front mounting tube 231, balance the trailer on the wheels, and roll the trailer sideways from place to place on the wheels. Because of the reduced thickness or height of the collapsed trailer in the stowing and rolling modes, that is the dimension from the top of the trailer bed, defined by a plane tangential to the mounting tubes, to the exposed tips of the axles 292, the trailer can be rolled through a standard doorway, as 400, but also through a passageway as narrow as seventeen inches. This feature is especially useful for small bicycle shops with limited personnel that may wish to display the trailer outside in its earth-traversing mode during the day and then collapse and move the trailer inside the shop for safekeeping at night.

As previously mentioned, the trailer 200 is especially suited for manufacture and sale in kit form and for United Parcel Service shipment, a very significant cost factor. Thus, the main frame 222 and suspension units 244 can be disconnected from each other, the wheels 290 can be released from the suspension arms 246, and the shock absorbers 300 can be removed from the suspension arms. The channels 340, 342, and 344 can be detached from the mounting tubes 231 and 232, and the latter can be detached from the side and central tubes 228 and 230. Of course, the towbar 320 is releasable from the supporting frame. Thus, the parts of the entire trailer can be packaged in a minimum number of standard UPS boxes, three currently, and sold as a kit, and the ultimate user can assemble these parts into the trailer as described.

From the foregoing, it will be understood that the preferred embodiment of the trailer 200 in accordance with the principles of the present invention has load-supporting, suspension, parking, stowing and rolling functions. Although the trailer is especially useful for transporting bicycles 150, it will be understood that other loads may be accommodated while retaining many of the features and advantages of the invention. Bicycles are transported in a secure upstanding position, but the trailer can be disconnected from the towing vehicle and parked with the bicycles in a secure position, thereby allowing the vehicle to be moved without bicycles being attached. Even at highway speeds and over bumpy roads, the bicycles are transported in a safe and dependable manner and without noticeable effect on the towing vehicle. The trailer has proper balance and a high performance suspension system to cushion the load, to keep it level and to avoid flipping over by maintaining traction. The trailer can be readily stored without its load of bicycles by standing the main frame and suspension frames units 222 and 224 on the legs 238, 320 and by folding the wheels 290 under the main suspension frame. The balance of the trailer allows it to be manually maneuvered with a load of bicycles or into its stowing position when empty. In its rolling mode, one person can move it sideways even through a narrow passageway. Although each embodiment is adapted to carry five regular bicycles or three tandem bicycles, a wider trailer accommodating more bicycles is within the scope of the invention.

Although two embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A trailer having earth-traversing and stowing modes, comprising:
   a load-supporting frame having front and rear ends and opposite sides, said frame providing a trailer bed lying in a generally horizontal plane when in the earth-traversing mode;
   a pair of transversely spaced suspension arms having front ends individually pivotally mounted on the front end of the frame for independent elevational movement of the arms relative to the frame when the trailer is in its earth-traversing mode, said arms extending rearwardly and outwardly and having rear portions restively extending along opposite sides of the frame;
   a pair of transversely spaced ground-engaging wheels individually mounted on the rear portions of the arms adjacent to the opposite sides of the frame for elevational movement with the arms, the peripheries of the wheels extending upwardly in adjacent relation to the trailer bed in said earth-traversing mode and also extending rearwardly in adjacent relation to the rear end of the frame; and
   a pair of shock-absorbers connected to the frame and the respectively adjacent rear portions of the arms so that each shock-absorber, working through elevational movement of its associated arms can maintain the trailer bed in a generally horizontal attitude when stationary and during earth-traversing movement and can also maintain traction of the wheels with the ground.

2. The trailer of claim 1,
   wherein said pairs of suspension arms and shock absorbers constitute a pair of suspension units having an earth traversing mode wherein the units are generally vertically disposed in transversely spaced relation to each other on opposite sides of the frame and a stowing mode wherein the units are in a generally common plane and in side-by-side relation to the load supporting frame and folded thereunder;
   wherein there are a pair of legs projecting rearwardly from the rearward end of the frame;
   wherein there is a tow bar;
   wherein there are couplings adapted to connect the tow bar to the frame in both the earth traversing and stowing modes; and
   wherein the tow bar is connected to one of the couplings for the stowing mode whereby the legs and tow bar are in triangular relationship with each other in said stowing mode and are engageable with a support surface to support the trailer in the stowing mode.

3. The trailer of claim 1,
   wherein the frame is rectangular; and
   wherein the wheels are disposed outwardly of opposite sides of the frame in said earth traversing mode.

4. The trailer of claim 1,
   wherein each shock-absorber is connected to the rear portion of its associated arm below the rotational axis of its associated wheel.

5. The trailer of claim 4,
   wherein each shock-absorber is connected to the frame above and forwardly of the rotational axis of its associated wheel.

6. The trailer of claim 1,
   wherein each shock-absorber is connected to the frame above and forwardly of the rotational axis of its associated wheel.

7. The trailer of claim 1,
   wherein each shock-absorber is disposed in a plane that is in inwardly offset adjacent spaced relation to the rear portion of its respective arm and that passes through or is closely adjacent to the respective opposite side of the frame;
   wherein the wheels are located outboard of the frame; and
   wherein the rear portions of the arms are respectively located between their adjacent wheels and shock-absorbers.

8. The trailer of claim 1, wherein there are bicycle clamps on the trailer bed.

9. The trailer of claim 1, wherein the peripheries of the wheels extend above the trailer bed when the frame is in its earth-traversing mode and the shock-absorbers are not under load.

10. The trailer of claim 1 for use in carrying bicycles, wherein bicycle fasteners are attached to the frame.

11. The trailer of claim 10, wherein the bicycle fasteners include bicycle frame clamps and bicycle fork clamps.

12. The trailer of claim 10, wherein the fasteners are spaced transversely of the frame.

13. A trailer having earth-traversing and stowed modes, comprising:

a load-supporting frame having forward and rearward ends and opposite sides and a trailer bed lying in a generally horizontal plane when the trailer is in said earth-traversing mode;

trailer wheels;

shock-absorbers each including a cylinder and piston circumscribed by a compression spring independently elevationally movably suspending the frame on the wheels for movement between earth-traversing positions in the earth-traversing mode of the trailer wherein the wheels and the shock-absorbers are in transversely spaced relation to each other to support the frame and stowed positions in the stowed mode of the trailer wherein the wheels and shock-absorbers are generally parallel to the frame and folded under the bed thereof; and a tripod connected to the frame for self-support of the trailer in upstanding position when the wheels are in their stowed positions.

14. The trailer of claim 13, wherein the trailer includes a tow bar releasably connected to the frame in either the earth-traversing mode or the stowed mode; and wherein the tripod includes legs extended from the frame, said legs also including said tow bar in its stowed mode, said legs being in triangular relation to each other when forming the tripod.

15. The trailer of claim 13, wherein there are bicycle clamps on the load-supporting frame.

16. A bicycle trailer adapted for shipping in kit form, comprising:

a main bicycle supporting frame including front, rear, and side members integrally connected in the general shape of a rectangle of predetermined maximum length and width acceptable for shipping, said frame being positionable in a generally horizontal attitude during earth traversal of the trailer;

elongated front and rear mounting members extending transversely of and releasably connected to the side members adjacent to the front and rear members respectively, said mounting members having lengths greater than said predetermined maximum width, being spaced farther apart than said predetermined maximum length, and constituting a trailer bed disposed in a generally horizontal attitude during earth traversal of the trailer;

bicycle attachment devices for releasably attaching bicycles in upright positions on the mounting members;

a suspension system including arms releasably connected to and under the frame, shock-absorbers releasably interconnecting the arms and the frame, and wheels releasably connected to the arms for supporting the frame for earth-traversing movement; and a tow bar releasably connected to the frame and extending forwardly thereof, whereby the mounting members, the bicycle attachment devices, the arms, the shock absorbers, the wheels, and the tow bar can be released from the frame and from each other for shipment in packaging not exceeding said predetermined maximum dimensions but can be reassembled so that said trailer bed is able to accommodate a bicycle load whose length and width exceeds said predetermined maximum length and width.

17. The trailer of claim 16, wherein the bicycle attachment devices include a plurality of elongated bicycle channels releasably attached to the mounting members and extending lengthwise of the frame in substantially uniformly spaced relation transversely thereof.

18. The trailer of claim 17, wherein the bicycle attachment devices also include clamps releasably attached to the mounting members for releasably clamping the bicycles in their respective channels.

* * * * *